(12) United States Patent
Curaudeau et al.

(10) Patent No.: US 11,047,308 B2
(45) Date of Patent: Jun. 29, 2021

(54) ACOUSTIC PANEL FOR THRUST REVERSERS

(71) Applicant: THE BOEING COMPANY, Chicago, IL (US)

(72) Inventors: Alexandre D. Curaudeau, Mount Pleasant, SC (US); Brian L. Riedel, Summerville, SC (US); Taurus L. Brackett, II, Summerville, SC (US)

(73) Assignee: THE BOEING COMPANY, Chicago, IL (US)

(*) Notice: Subject to any disclaimer, the term of this patent is extended or adjusted under 35 U.S.C. 154(b) by 152 days.

(21) Appl. No.: 16/023,512

(22) Filed: Jun. 29, 2018

(65) Prior Publication Data

US 2020/0003124 A1 Jan. 2, 2020

(51) Int. Cl.
  *F02C 7/24* (2006.01)
  *B64D 29/00* (2006.01)
  *F02K 1/72* (2006.01)

(52) U.S. Cl.
  CPC ............... *F02C 7/24* (2013.01); *B64D 29/00* (2013.01); *F02K 1/72* (2013.01); *F05D 2250/283* (2013.01); *F05D 2260/96* (2013.01)

(58) Field of Classification Search
  CPC ... F02C 7/24; F02K 1/72; F02K 1/827; B64D 2033/0206; B64D 29/00
  See application file for complete search history.

(56) References Cited

U.S. PATENT DOCUMENTS

| 4,826,106 A | 5/1989 | Anderson |
| 9,895,840 B2 | 2/2018 | Bartel et al. |
| 2014/0150403 A1 | 6/2014 | Stuart et al. |

FOREIGN PATENT DOCUMENTS

| EP | 1770011 B1 | 5/2011 |
| GB | 2395175 B | 1/2005 |
| WO | 2010088069 A2 | 8/2010 |

OTHER PUBLICATIONS

Communication Pursuant to Article 94(3) EPC for Application No. 19177596.4 dated Dec. 5, 2019.
European Search Report for Application No. 19177596.4 dated Nov. 22, 2019, 3 pgs.

*Primary Examiner* — Katheryn A Malatek
(74) *Attorney, Agent, or Firm* — Moore IP Law

(57) ABSTRACT

An acoustic panel includes a base, a cantilevered portion, a gap, and a support member. The base has a surface defining a plurality of cavities configured to attenuate noise from an engine. The cantilevered portion extends from the base and is configured to be removably coupled with a portion of a transcowl. The gap is defined by the base and the cantilevered portion. The support member is coupled to the cantilevered portion and the base, and the supporting member is configured to support the cantilevered portion.

22 Claims, 20 Drawing Sheets

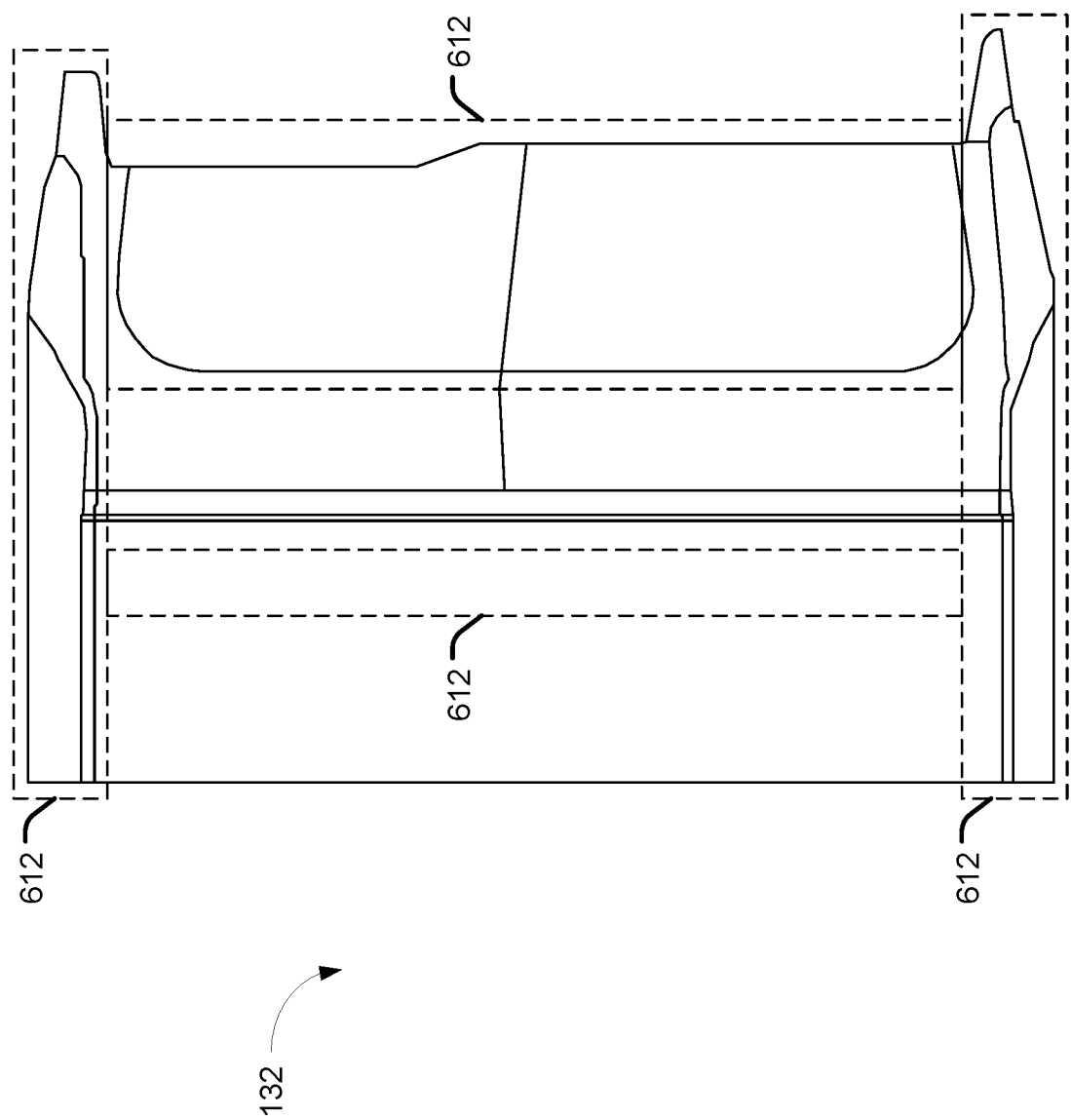

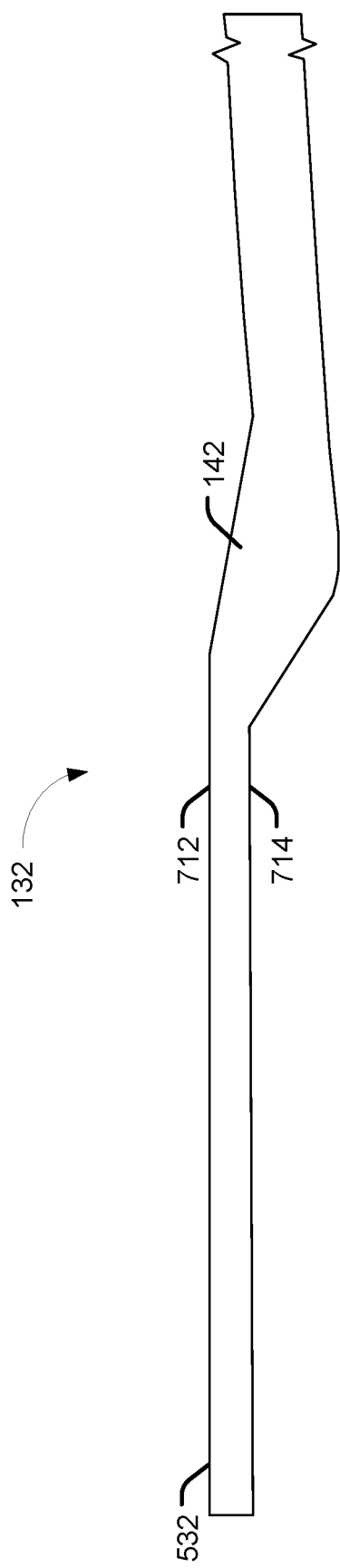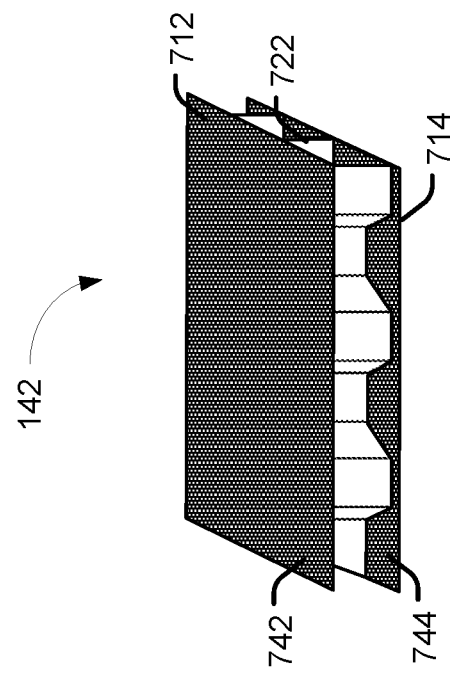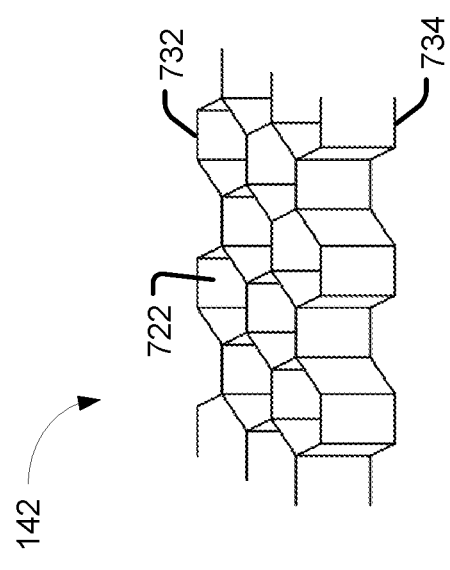
FIG. 7A
FIG. 7C
FIG. 7B

ACOUSTIC PANEL FOR THRUST REVERSERS

FIELD OF THE DISCLOSURE

The present disclosure is generally related to acoustic panels including a cantilevered doubler.

BACKGROUND

Airplanes with jet engines are often equipped with thrust reversers that increase drag on the airplane during landings, thereby reducing the speed of the aircraft. A thrust reverser increases drag by effectively reversing the flow of bypass or exhaust gases through the jet engine. In one type of thrust reverser, referred to as a cascade-type, a transcowl on the jet engine nacelle translates rearwardly to redirect the airflow forwardly and thereby produce reverse thrust.

The transcowl is coupled to an acoustic panel which reduces engine noise and provides aerodynamic surfaces on both sides (inside and outside surfaces) of the acoustic panel. The acoustic panel is a complex part because it has very high design requirements for noise reduction, aerodynamic drag, and structural support. The acoustic panel is coupled to the transcowl via fasteners that go through the entire thickness of the acoustic panel, fasteners that only attach to one facesheet of the acoustic panel, or adhesives. When fasteners are used, the area where the acoustic panel is coupled to transcowl may not be acoustically active and may be heavier because fasteners are used to join the two pieces. When adhesives are used, decoupling of the acoustic panel from the transcowl for maintenance and service of the jet engine or nacelle degrades performance and creates extra service time for repairing and rebonding or fasteners are used to recouple the acoustic panel to the transcowl. Additionally, removing and re-installing the above fasteners can degrade performance and creates extra service time. Thus, current acoustic panels may have significant acoustically inactive regions, leading to reduced acoustic performance, and/or are very expensive and time consuming to fabricate and maintain.

SUMMARY

In a particular implementation, an acoustic panel includes a base having a surface defining a plurality of cavities configured to attenuate noise from an engine. The acoustic panel also includes a cantilevered portion extending from the base and configured to be removably coupled with a portion of a transcowl. The acoustic panel includes a gap defined by the base and the cantilevered portion. The acoustic panel further includes a support member coupled to the cantilevered portion and coupled to the base, the support member configured to support the cantilevered portion.

In another particular implementation, a vehicle includes an engine, a cowl partially enclosing the engine, and a thrust reverser assembly. The thrust reverser assembly is coupled to the cowl. The thrust reverser assembly includes a transcowl and includes an acoustic panel configured to attenuate noise from the engine. The acoustic panel includes a base having a surface defining a plurality of cavities. The acoustic panel also includes a cantilevered portion extending from the base and configured to be removably coupled with a portion of the transcowl. The acoustic panel includes a gap defined by the base and the cantilevered portion. The acoustic panel further includes a support member coupled to the cantilevered portion and coupled to the base, the support member configured to support the cantilevered portion.

In a particular implementation, a method of manufacturing an acoustic panel includes applying a layer of composite material to a base, the base having a surface defining a plurality of cavities. The method also includes applying a layup support member to the layer of composite materials. The method further includes forming a cantilevered portion extending from the base. The layup support material is positioned between the base and the cantilevered portion. After forming, the cantilevered portion is configured to be coupled to and support another component, and a portion of a surface of the cantilevered portion is an aerodynamic surface.

By using an acoustic panel with a cantilevered portion, the cantilevered portion can be attached to another component and the acoustic panel has an increased acoustically active area, a potential for a lower weight configuration, and offers easier maintenance and servicing of the acoustic panels. Additionally, maintaining and servicing the acoustic panel does not degrade performance like compared to conventional configurations. Accordingly, engine noise is decreased, which leads to less noise pollution and enables an aircraft to operate during restricted noise times.

BRIEF DESCRIPTION OF THE DRAWINGS

FIG. 6 is a diagram that illustrates a side view of the acoustic panel of FIG. 5;

FIG. 7A is a diagram that illustrates a cross-section view of a fore portion of the acoustic panel of FIG. 3;

FIG. 7B is a diagram that illustrates a perspective view of cavities of a base of an acoustic panel;

FIG. 7C is a diagram that illustrates a perspective view of an acoustic panel;

DETAILED DESCRIPTION

Figure 1:
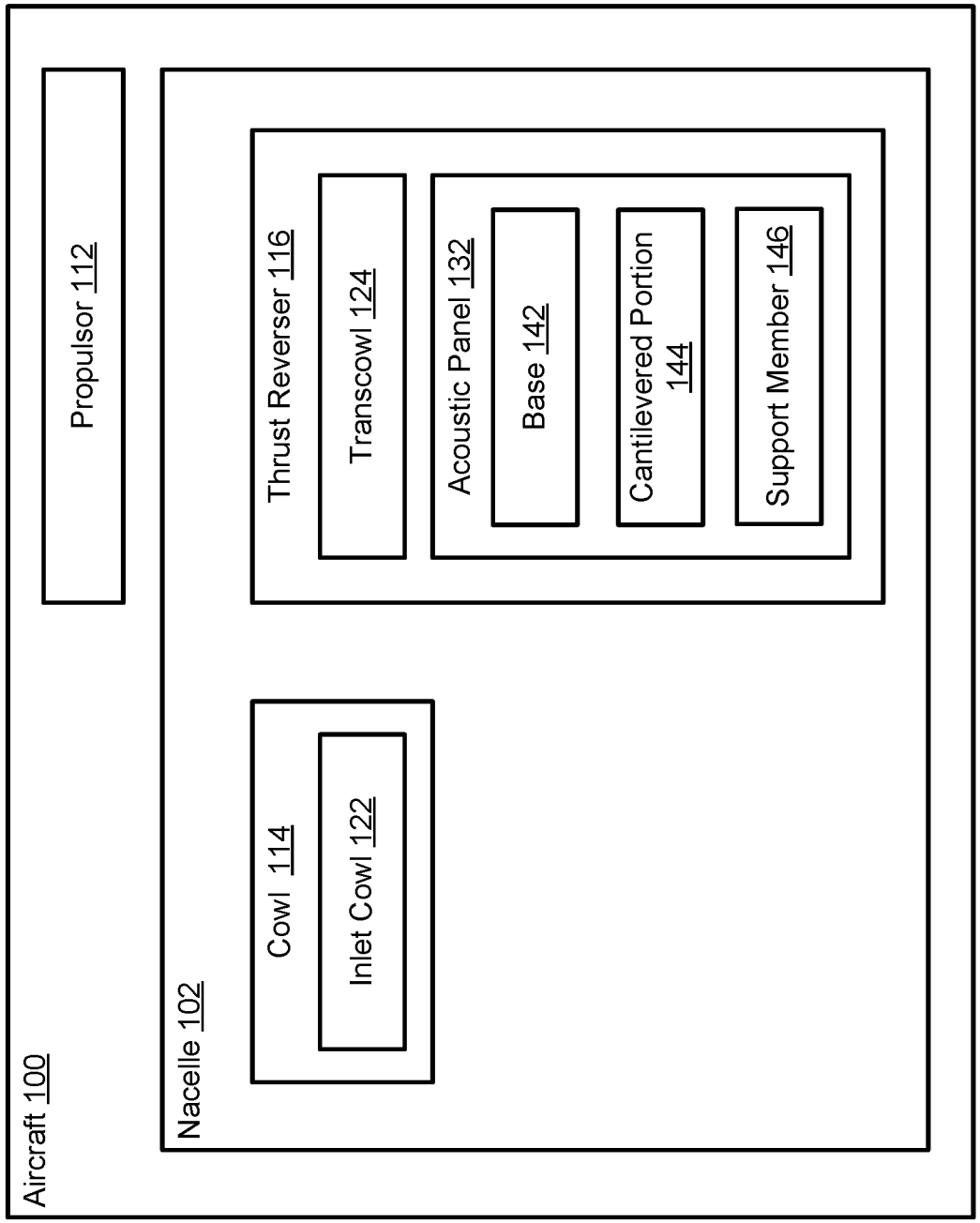
FIG. 1 is a block diagram that illustrates an example of an aircraft including an acoustic panel having a cantilevered portion.

The disclosed embodiments provide a lighter and higher performing acoustic panel for use in thrust reversers to make the thrust reversers easier to assemble and disassemble. A method of manufacturing the acoustic panel is also disclosed. Thrust reversers are commonly included in or form a portion of a nacelle of an aircraft. In the context of a nacelle of an aircraft, acoustic performance, manufacturing costs, and repairability are major factors. Acoustic performance is primarily affected by an amount of surface area that is acoustically active, i.e., a larger acoustically active area reduces engine noise output. For example, the acoustically active area vibrates to dissipate or dampen noise generated by the engine. However, using fasteners (e.g., removable fasteners) reduces the acoustically active area. Special permanent fasteners (e.g., blind permanent fasteners that only attach to one facesheet of the acoustic panel and that penetrate the acoustically active area) can be used to limit the reduction in acoustically active area, but upon servicing the part or area, the benefit is lost.

Nacelle components are high value components and are expensive to produce because their structural and functional requirements (e.g., aerodynamic and acoustical properties). To meet such structural and functional requirements, the manufacturing of nacelle components includes multiple tools, machines, and processes. In particular, a thrust reverser outer acoustic panel has aerodynamic requirements on both the outer and inner surfaces, and is the most expensive component of the thrust reverser. In-service repairs are common as nacelles are exposed to both man-made and natural damage. The close proximity of these structures to the ground and regular engine maintenance requirements makes them very susceptible to damage from tool drop, handling, and support vehicles. Nacelles are also commonly exposed to natural damage such as lightning strikes and hail strikes. It is common for a translating sleeve (e.g., a transcowl) of the thrust reverser, the most prone to damage due to exposed surfaces, to be disassembled for these types of repair. Unfortunately because of the high level of integration and permanent attachment schemes, disassembly for repair operations can be expensive, be time consuming, increase drag, and reduce acoustic performance.

The acoustic panels described herein include a cantilevered portion that extends outwards from a base of the acoustic panel. The cantilevered portion is supported by a support member and is configured to attach to another component, such as the transcowl. The cantilevered portion simplifies bond panel manufacturing operations, reduces weight, increases the acoustically active area, and makes the translating sleeve more repairable. Cantilevering an attachment area (e.g., an attachment flange) over the base of the acoustic panel eliminates special through fasteners or special blind fasteners which typically extend through an attachment area of the base and require modifications to the base surrounding the attachment area. Accordingly, more standard, less expensive bolts can attach the transcowl to this attachment area using a nut plate and bolt. Furthermore, disassembly of the transcowl from the cantilevered portion does not result in an acoustically active area loss and can be done with less specialized tools as compared to conventional configurations.

FIG. 1 illustrates a block diagram of an example of an aircraft 100 that includes a nacelle 102 and a propulsor 112. The nacelle 102 is configured to house the propulsor 112 and to be coupled to the aircraft 100. The propulsor 112 is housed within the nacelle 102 and is configured to generate thrust. The propulsor 112 includes or corresponds to a jet engine or another type of propulsor.

The nacelle 102 includes a cowl 114 and a thrust reverser assembly 116 (referred to herein as a thrust reverser 116). The nacelle 102 is coupled to the aircraft 100 via a strut or a pylon. The nacelle 102 can be connected to a wing of the aircraft 100, a fuselage of the aircraft 100, or an empennage (tail section) of the aircraft 100.

The cowl 114 is configured to house (partially encase or enclose) the propulsor 112 and includes multiple sections or pieces. As illustrated in FIG. 1, the cowl 114 includes an inlet cowl 122. The cowl 114 is configured to reduce propulsor noise, to protect the propulsor 112, and to direct airflow to the propulsor 112. In some implementations, the cowl 114 includes a second portion (e.g., a fan cowl 212 of FIG. 2). The second portion (e.g., the fan cowl 212) may form an intermediary portion of the nacelle 102 and may be positioned between the inlet cowl 122 and a transcowl 124.

The thrust reverser 116 is configured to generate thrust. For example, the thrust reverser 116 is configured to generate forward thrust in a first configuration and is configured to generate reverse thrust in a second configuration. The reverse thrust includes thrust in a direction opposite the propulsor 112, thrust in a direction that opposes a direction of travel of the aircraft 100, and/or thrust that reduces the forward thrust (e.g., thrust that propels the aircraft 100 in a forward direction). The thrust reverser 116 includes or corresponds to a translating thrust reverser, a cascade thrust reverser, a cold stream thrust reverser, a clamshell thrust reverser, or a combination thereof.

In a translating thrust reverser 116, the thrust reverser 116 vents bypass airflow from the propulsor 112 out of an opening in the nacelle 102. The opening in the nacelle 102 is created by the transcowl 124 translating rearwards or aft from the cowl 114 (e.g., the inlet cowl 122 and/or the fan cowl 212 of FIG. 2), as described further with respect to FIGS. 2-4.

The thrust reverser 116 is coupled (e.g., moveably coupled) to the cowl 114 and includes the transcowl 124 and an acoustic panel 132 configured to reduce or attenuate propulsor noise. The acoustic panel 132 also directs airflow within the nacelle 102 and forms an outer portion of the nacelle 102. Thus, the acoustic panel 132 has aerodynamic surfaces. The aerodynamic surfaces are configured to provide low drag. For example, the surfaces (or portions of the surfaces) of the acoustic panel 132 are machined to have a contour that reduces drag and have a composition (e.g., a surface material and/or smoothness) that reduces drag.

The acoustic panel 132 includes a base 142, a cantilevered portion 144, and a support member 146. The base 142, the cantilevered portion 144, and the support member 146 are joined (e.g., fixedly coupled or fixedly adhered) to form a monolithic piece. Fabrication of the acoustic panel 132 is further described with reference to FIGS. 9-13 and 18. The acoustic panel 132 (i.e., the cantilevered portion 144 thereof) is coupled to a portion of the transcowl 124. In some implementations, the acoustic panel 132 forms and/or defines an exterior portion or surface of the nacelle 102. Although one acoustic panel 132 is illustrated in FIG. 1, the nacelle 102 (e.g., the cowl 114 thereof) may include additional acoustic panels 132.

The base 142 (e.g., a base member) includes a plurality of cavities configured to reduce or attenuate propulsor noise. For example, the base 142 includes a plurality of hexagonal shaped (e.g., honeycomb shaped) cavities that dampen or absorb sound waves and block sound waves generated by the propulsor 112. The hexagonal shaped cavities also provide a relatively high degree of strength per weight and are repeatable without overlaps or gaps (i.e., hexagonal shaped cavities are capable of being efficiently tessellated).

The cantilevered portion 144 is configured to couple to a portion of the transcowl 124. For example, in a cascade-type thrust reverser, the cantilevered portion 144 is coupled to the transcowl 124 via fasteners, as described further with reference to FIG. 17. The cantilevered portion 144 may include or correspond to a doubler (or a portion thereof), as described further with reference to FIG. 8. A doubler is a laminated support member and is often used as a support for a skin or an external portion of the aircraft 100. As compared to conventional acoustic panels which do not include a cantilevered portion and couple to an acoustically active area to the transcowl 124, coupling the cantilevered portion 144 to the transcowl 124 increases the acoustically active area of the acoustic panel 132, reduces a weight of the acoustic panel 132, and facilitates maintenance and servicing without performance losses.

The support member 146 is configured to support the cantilevered portion 144 and to absorb loads during operation of the aircraft 100. The support member 146 may include or correspond to a noodle 814 or a molded insert 1512, as described with reference to FIGS. 8 and 15.

In other implementations, the propulsor 112 is included in a fuselage or empennage of the aircraft 100, such as in a tri-jet aircraft. In such implementations the cantilevered portion 144 is coupled to a portion of the fuselage or empennage of the aircraft instead of being coupled to a portion of the transcowl 124.

Although the acoustic panel 132 has been described as an acoustic panel (e.g., an outer acoustic panel or wall) of a thrust reverser 116, the acoustic panel 132 may couple to other components. The aerodynamic surfaces of the acoustic panel 132 provide low drag and the cantilevered portion 144 allows the acoustic panel 132 to be coupled with other components and provide a higher quality aerodynamic surface. For example, the acoustic panel 132 may be coupled to flight control surfaces and components thereof.

The acoustic panel 132 may be manufactured by exemplary methods of manufacturing described with reference to FIGS. 9-13 and 18. Additionally, the methods of manufacturing the acoustic panel 132 can be applied to manufacturing other components to increase an active area of a base member thereof, to join two components to form an aerodynamic surface, or to couple a second component to a first component via a cantilevered portion 144 rather than via a base 142 of the first component, such as for design constraints (e.g., repairability, manufacturing time, costs, etc.).

Figure 2:
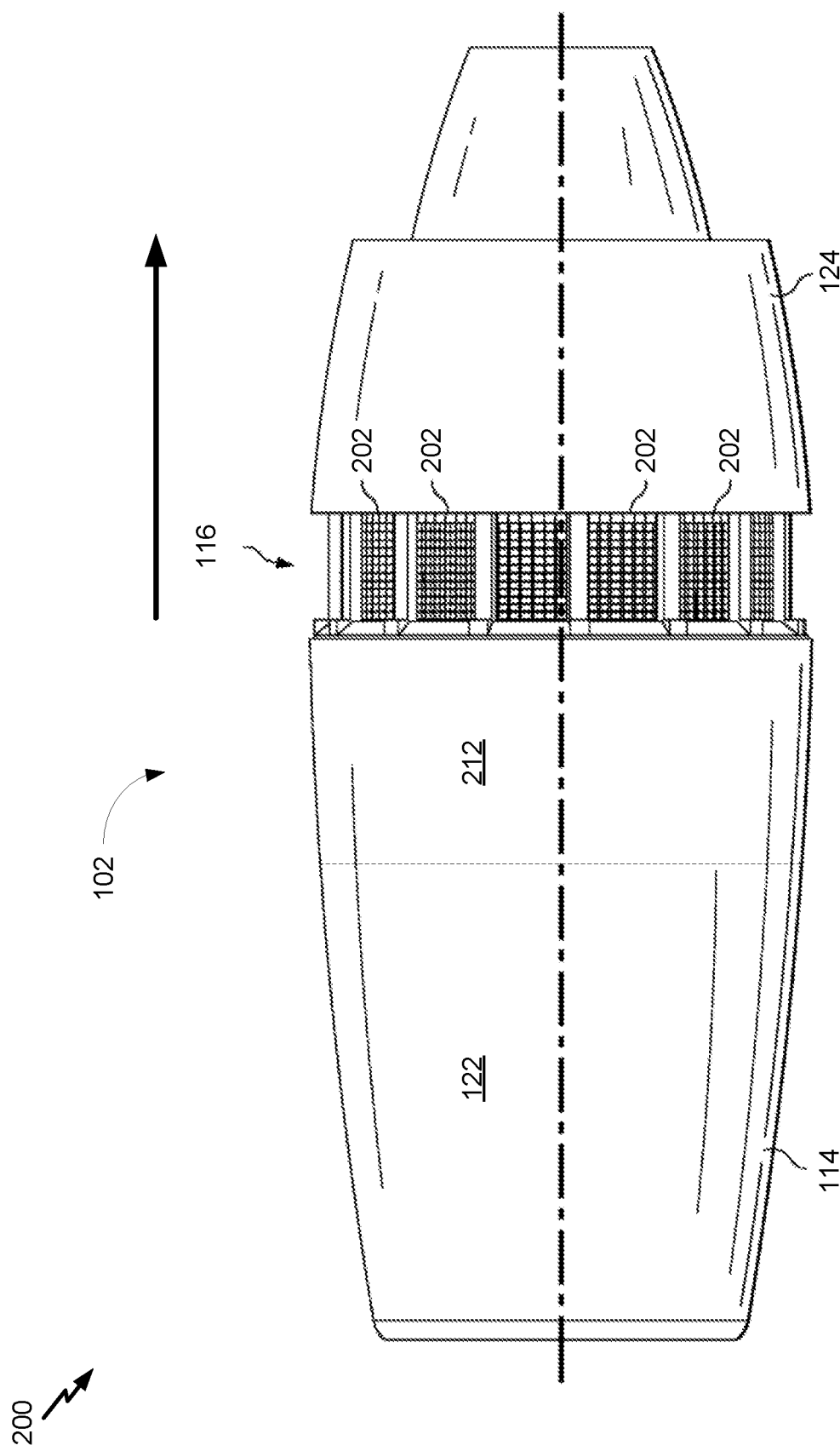
FIG. 2 is a diagram that illustrates a side view of a nacelle having a transcowl shifted rearwardly to expose a cascade-type thrust reverser.
Figure 3:
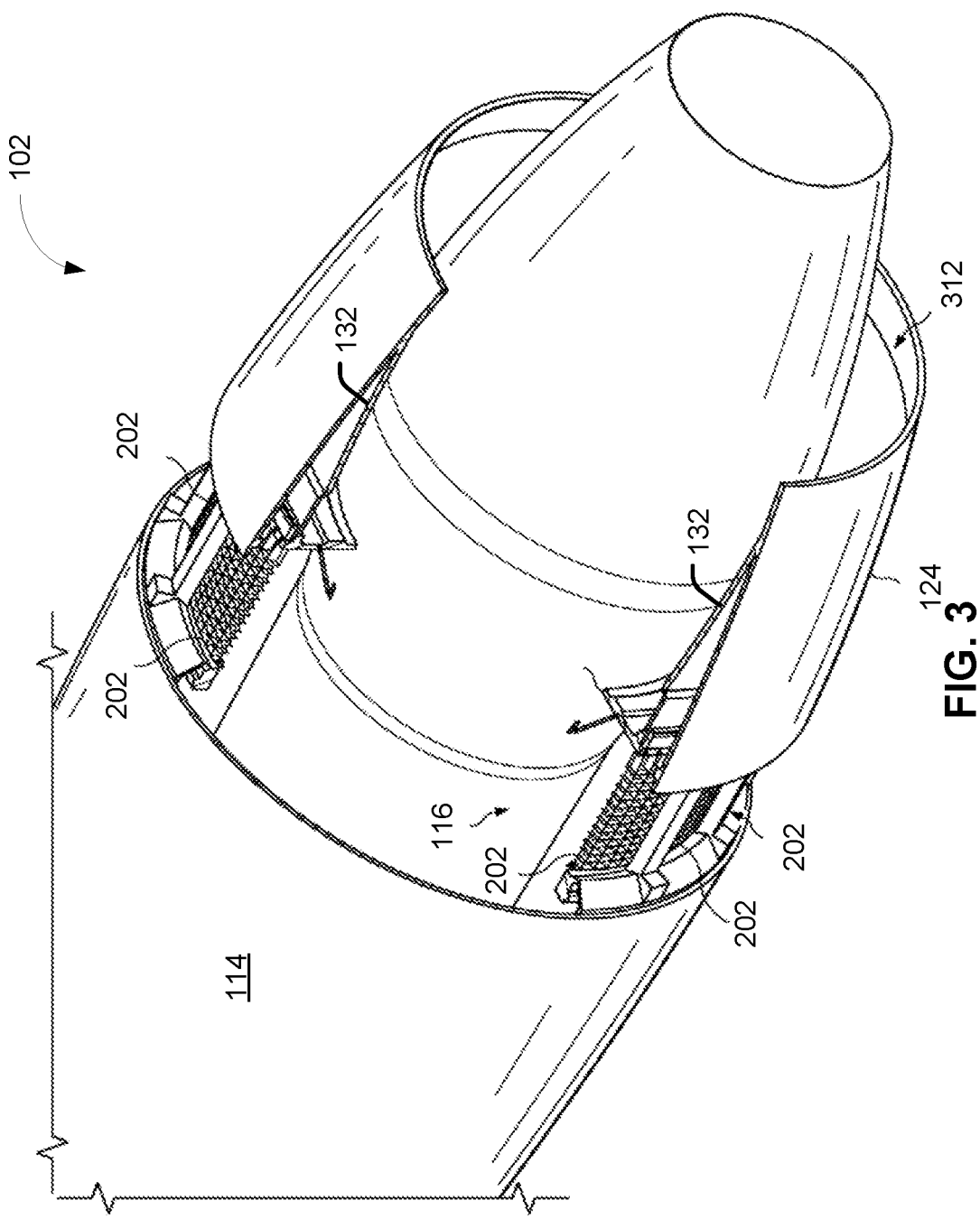
FIG. 3 is a diagram that illustrates a perspective view of the aft end of the jet engine shown in FIG. 2.
Figure 4:
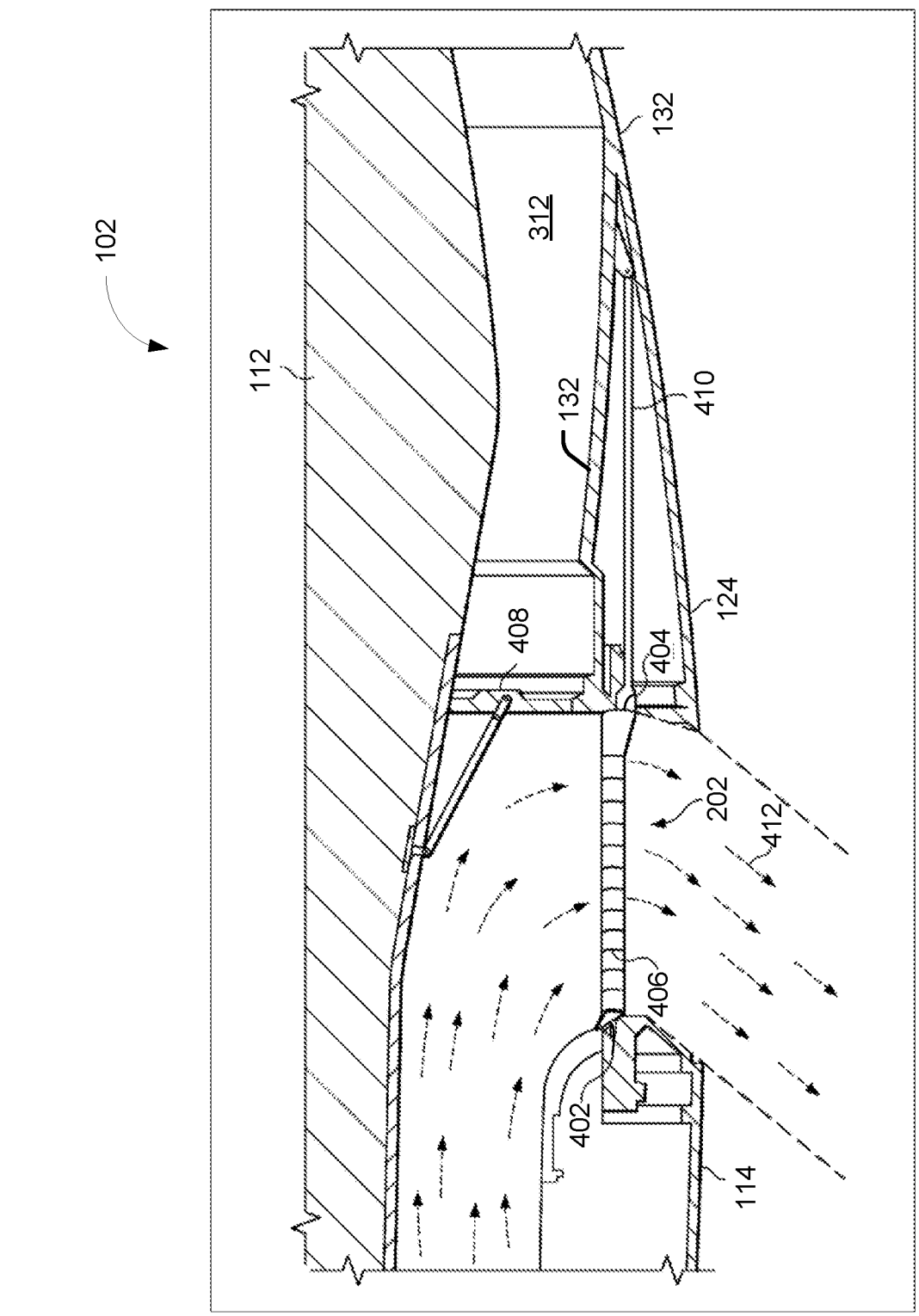
FIG. 4 is a diagram that illustrates a sectional view of a portion of the jet engine shown in FIGS. 2 and 3, depicting airflow through the thrust reverser.

Operation of an exemplary thrust reverser 116 including the acoustic panel 132 is described with reference to FIGS. 2-4. Referring to FIGS. 2-4, an example of a cascade-type thrust reverser assembly and operation thereof is depicted by diagrams 200-400. FIG. 2 is a diagram 200 that illustrates a side view of the nacelle 102 of the aircraft 100 depicting the transcowl 124 having shifted rearwardly (as indicated by the arrow) to expose the (cascade-type) thrust reverser 116. FIG. 3 is a diagram 300 that illustrates a perspective view of the nacelle 102 and the thrust reverser 116 shown in FIG. 2. FIG. 4 is a diagram 400 that illustrates a cross-section view of a portion of the nacelle 102 shown in FIGS. 2 and 3, depicting airflow through the thrust reverser 116.

As illustrated in FIG. 2, the cascade-type thrust reverser 116 includes a plurality of circumferentially arranged, thrust reversing cascade grid panels 202, sometimes referred to as cascade baskets. During normal flying operations, the transcowl 124 is in a closed, forward position, joining the transcowl 124 with the cowl 114 (e.g., the inlet cowl 122 and/or the fan cowl 212), and thereby covering the cascade grid panels 202.

During landing, the transcowl 124 is moved from its closed position to its open, rearwardly extended position (as shown in FIGS. 2-4) by actuator rods 410 of FIG. 4. Opening the transcowl 124 exposes the cascade grid panels 202 to the surrounding environment. When the transcowl 124 is in the open position, the thrust reverser 116 is activated by deploying circumferentially located blocker doors 408 of FIG. 4. Deploying the blocker doors 408 prevents bypass exhaust from flowing out of a nozzle 312 of FIG. 3 and forces the bypass exhaust through the cascade grid panels 202, as shown by the arrows 412 in FIG. 4. Each of the cascade grid panels 202 includes a plurality of axially extending strongbacks (not shown), a plurality of vanes 406 extending between the strongbacks, and fore and aft mounting flanges 402, 404 respectively. The cascade grid panels 202 direct the flow of the exhaust forward, and optionally radially outward, producing a reversal in the direction of the exhaust flow. This reversal of the bypass exhaust flow results in a reversal of thrust that assists in slowing down the aircraft 100.

As illustrated in FIGS. 3 and 4, the acoustic panel 132 is coupled to the transcowl 124 and forms an exterior portion of the nacelle 102. To illustrate, an exterior surface (i.e., an aerodynamic surface) of the acoustic panel 132 corresponds to or forms a portion of an exterior portion of the nacelle 102 (e.g., forms a portion of the transcowl 124). FIG. 4 also illustrates that an interior surface of the acoustic panel 132 defines the nozzle 312 and is a second aerodynamic surface which directs the bypass exhaust when the transcowl 124 is in the forward or closed position. The acoustic panel 132 (e.g., the plurality of cavities thereof) attenuates noise produced by the propulsor 112.

Figure 5:
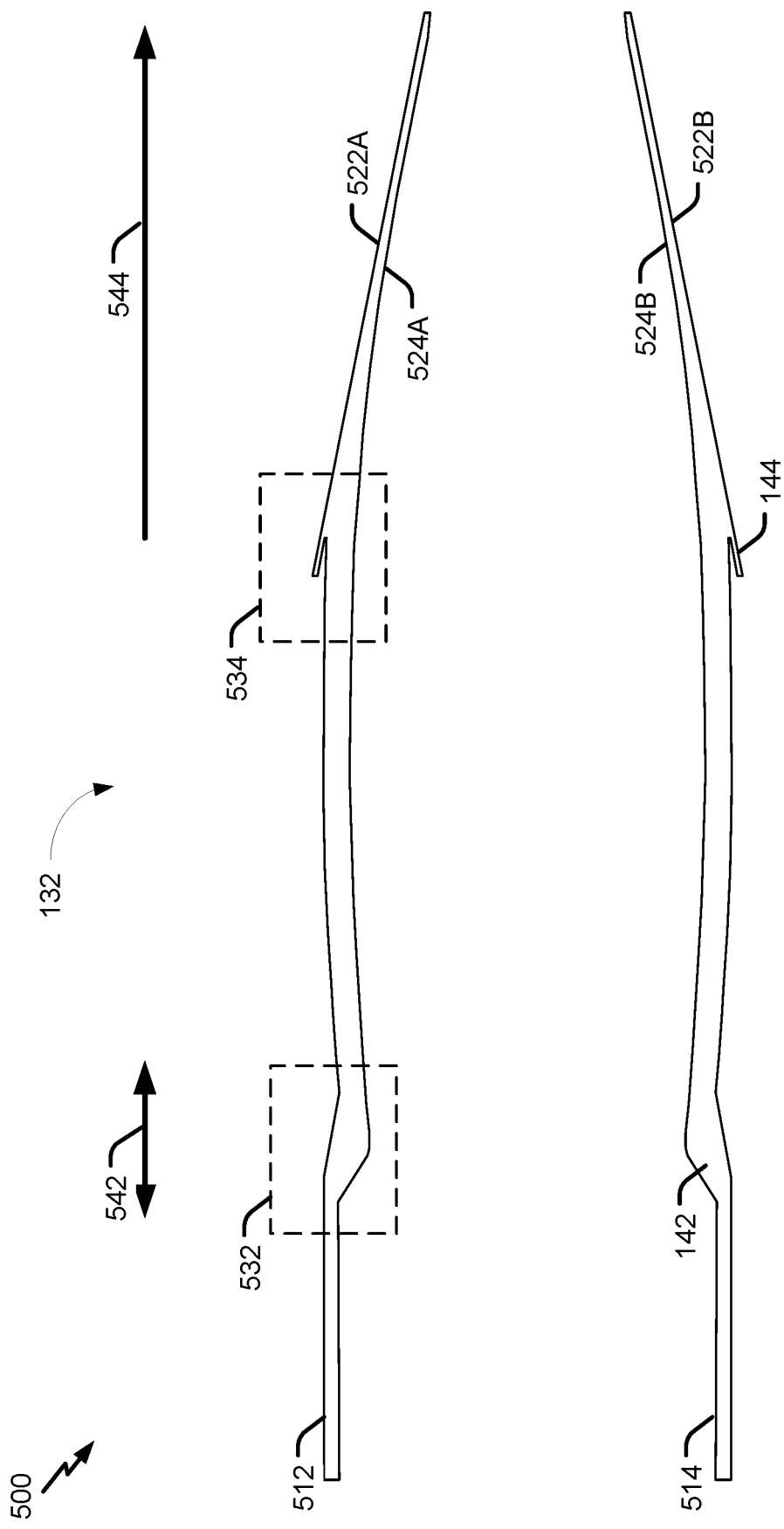
FIG. 5 is a diagram that illustrates a cross-section view of an example of the acoustic panel of FIG. 1.

FIG. 5 is a diagram 500 that illustrates a cross-section view of an example of the acoustic panel 132 of FIG. 1. Because the acoustic panel 132 is annular shaped, the cross-section illustrated in FIG. 5 includes an upper portion 512 (e.g., an upper-cross section) and a lower portion 514 (e.g., a lower cross-section). The acoustic panel 132 of FIG. 5 has a similar shape to the shape of the acoustic panel 132 of FIGS. 3 and 4.

The acoustic panel 132 includes aerodynamic surfaces 522, 524. A first aerodynamic surface 522 includes or corresponds to an exterior or external aerodynamic surface, i.e., an aerodynamic surface for exterior airflow of the nacelle 102. A second aerodynamic surface 524 includes or corresponds to an interior aerodynamic surface, i.e., an aerodynamic surface for fan duct bypass air flowing out of the nozzle 312 of FIG. 3 (when the blocker doors 408 of FIG. 4 are stowed). As illustrated in FIG. 5, the upper portion 512 includes aerodynamic surfaces 522A and 524A and the lower portion 514 includes aerodynamic surfaces 522B and 524B.

The upper portion 512 illustrates two areas of the acoustic panel 132 in dashed boxes, a fore portion 532 and an aft portion 534. The fore portion 532 includes a first machined transition area 542. In the machined transition areas, a surface of the acoustic panel 132 may be machined, processed, or finished to meet design requirements regarding a thickness of the acoustic panel 132. The aft portion 534 includes that cantilevered portion 144 and the support member 146. A second machined transition area 544 begins near the aft portion 534 (e.g., at the cantilevered portion) and extends rearward or aftward. The second machined transition area 544 may extend to a rear or aft end of the acoustic panel 132 in some implementations.

FIG. 6 illustrates a side view of the acoustic panel 132 of FIG. 5. In FIG. 6, the machined transition areas 542, 544 are shown in dashed boxes 612. As illustrated in FIG. 6, the cross-section of the acoustic panel 132 is not the same over the entire span of the acoustic panel 132, i.e., the acoustic panel 132 may be non-symmetrical with respect to a particular axis. Additionally, as the nacelle 102 may include multiple acoustic panels 132, each acoustic panel 132 may have a different shape than another acoustic panel 132. As compared to conventional acoustic panels 132 which are joined at a base member, the acoustic panel 132 has a reduction in machined transition areas 542, 544 (e.g., machined transitions surfaces). For example, in conventional acoustic panels 132 which are joined at a base member, the entire acoustic panel 132 has machined surfaces, which increases fabrication time and costs.

FIGS. 7A-7C illustrate an example of the acoustic panel 132 and the base 142 thereof. FIG. 7A is a diagram that illustrates a cross-section view of the fore portion 532 of the acoustic panel 132 of FIG. 3. In FIG. 7A, the base 142 of the acoustic panel 132 has a first surface 712 and a second surface 714. The base 142 includes a plurality of cavities 722, as illustrated in FIG. 7B, positioned (e.g., sandwiched) between two facesheets 742, 744, as illustrated in FIG. 7C.

FIG. 7B depicts surfaces 732, 734 of the base 142 defining the plurality of cavities 722. The plurality of cavities 722 of the base 142 have a hexagonal shape (e.g., a honeycomb shape), and the base 142 includes or corresponds to a "honeycomb structure" with the plurality of cavities 722 forming a "core" of the honeycomb structure. In other implementations, one or more of the plurality of cavities 722 have other shapes, such as a circular shape, a rectangular shape, a square shape, a pentagonal shape, an octagonal shape, another shape which may be tessellated, or a combination thereof. The plurality of cavities 722 are illustrated in FIG. 7B as extending through the base 142 of the acoustic panel 132, i.e., the plurality of cavities 722 correspond to through holes and are defined by both surfaces 732, 734. In other implementations, the plurality of cavities 722 do not extend through the acoustic panel 132. In a particular implementation, each of the surfaces 732, 734 defines a corresponding plurality of cavities 722.

The acoustic panel 132 (e.g., portions thereof) includes facesheets 742, 744 coupled to the surfaces 732, 734 that define the plurality of cavities 722 of the base 142, as illustrated in FIG. 7C. In a particular implementation, the facesheets 742, 744 include composite material, as further described with reference to FIG. 8. The facesheets 742, 744 may include or correspond to a skin of the acoustic panel 132 (and the nacelle 102) and include the surfaces 712, 714.

Figure 8:
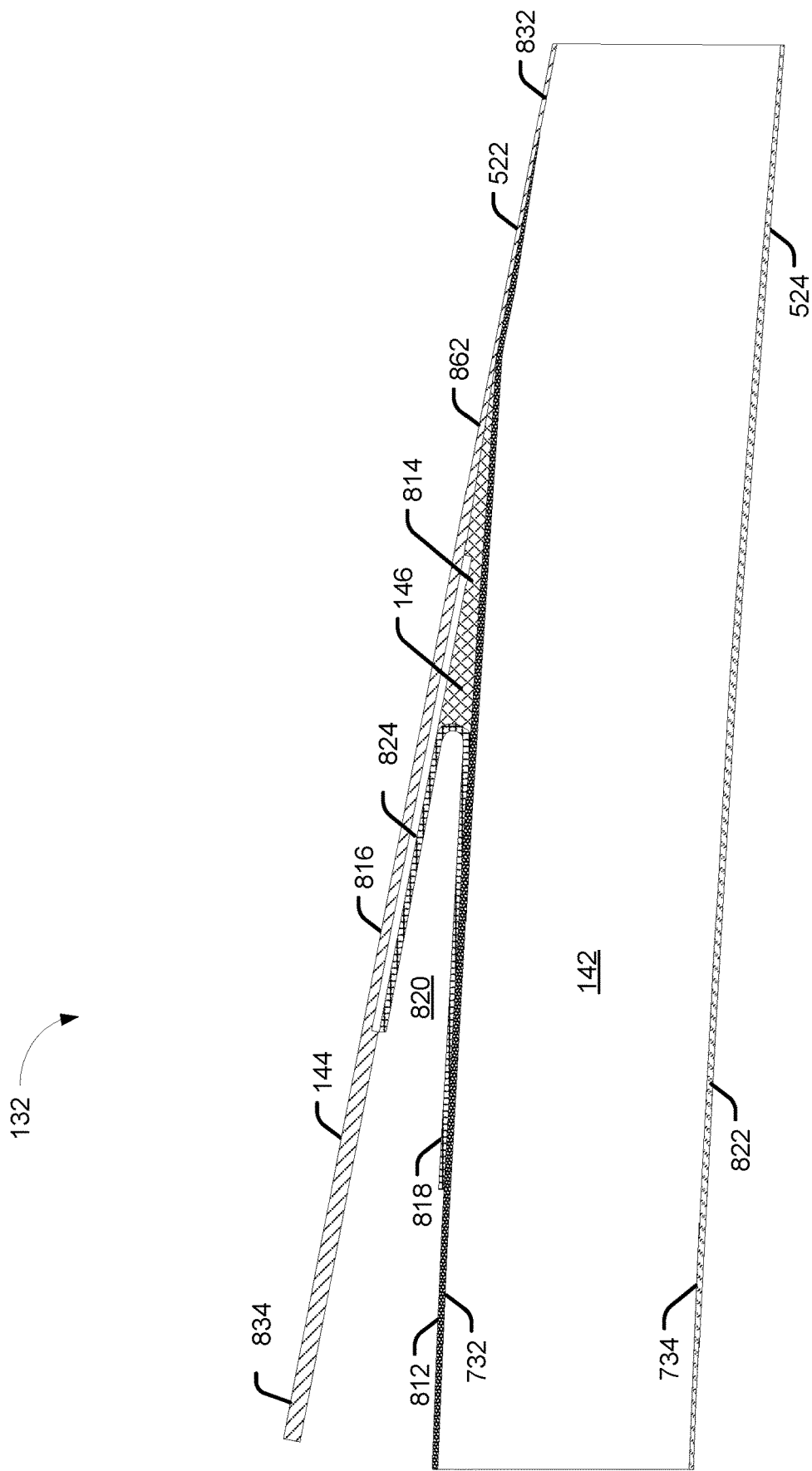
FIG. 8 is a diagram that illustrates a cross-section view of an example of the aft portion of the acoustic panel of FIG. 3.

FIG. 8 illustrates a cross-section view of an example of the aft portion 534 of the acoustic panel 132 of FIG. 3. The aft portion 534 of the acoustic panel 132 includes the base 142, the cantilevered portion 144, and the support member 146.

In the example illustrated in FIG. 8, the base 142 includes a top surface (corresponding to the first surface 712 of FIG. 7) and a bottom surface (corresponding to the second surface 714 of FIG. 7). A first layer of composite material 812 is coupled to at least a portion of the top surface of the base 142. In some implementations, the first layer of composite material 812 is configured to adhere or secure a doubler 816 to the base 142, as described with reference to FIGS. 9-13.

The doubler 816 is coupled to the base 142 and extends from the base 142 defining a gap 820. As illustrated in FIG. 8, the doubler 816 is in contact with the first layer of composite material 812 and is in contact with the base 142. In other implementations, the doubler 816 is in contact with the first layer of composite material 812 and the first layer of composite material 812 is in contact with the first surface 712 (e.g., the top surface) of the base 142.

The doubler 816 includes a proximal end 832 (proximal portion) and a distal end 834 (distal portion). The proximal end 832 is fixed or anchored to the base 142, such as a fixed or anchored end. The distal end 834 is free or floating relative to the base 142, such as a free end. A portion of the doubler 816 near and including the distal end 834 includes or corresponds to the cantilevered portion 144 of FIG. 1, as depicted in FIG. 8.

The cantilevered portion 144 of the doubler 816 is configured to be coupled to the transcowl 124 of FIG. 1 (or another component). For example, the cantilevered portion 144 is removably coupled with the transcowl 124 by fasteners (not shown in FIG. 8), as illustrated and described with reference to FIG. 17.

The doubler 816 includes composite material, such as carbon fiber reinforced polymers (CFRP). In some implementations, the doubler 816 is pre-formed (e.g., pre-cured) prior to attachment to the base 142 and assembly/formation of the acoustic panel 132, as described with reference to FIGS. 9-13 and 18. In other implementations, the doubler 816 is formed by disposing composite materials (e.g., uncured composite materials) onto the base 142 (or layers and components thereof) and curing the composite materials to form the doubler 816. A gap 820 is formed between and defined by the cantilevered portion 144 of the doubler 816 and the base 142.

A support member 146 is positioned between the doubler 816 and the base 142. As illustrated in FIG. 8, the support member 146 is a noodle 814 and is positioned between and in contact with the first layer of composite material 812 and the doubler 816. The noodle 814 is configured to support the doubler 816. For example, the noodle 814 supports the doubler 816 during operation and when coupled to the transcowl 124 of FIG. 1. A separate component or material (e.g., a layup support member 1112 of FIG. 11) may be used to support the doubler 816 during attachment of the doubler 816 to the base 142 or during formation of the doubler 816, as described with reference to FIG. 12. In some implementations, the noodle 814 includes a material having similar properties to the surrounding materials. For example, the noodle 814 includes a material that has similar elasticity and strength to the composite materials of the doubler 816 and the layers of composite material 812, 818, 822.

In the example illustrated in FIG. 8, the acoustic panel 132 further includes a second layer of composite material 818 coupled to the first layer of composite material 812, the support member 146, and the doubler 816. The second layer of composite material 818 is configured to support the cantilevered portion 144 during operation and to couple (e.g., secure) the support member 146 to the first layer of composite material 812 and the base 142.

In some implementations, the acoustic panel 132 includes an adhesive. For example, the acoustic panel 132 may include a layer of the adhesive positioned between the second layer of composite material 818 and each of the first layer of composite material 812, the noodle 814, and the doubler 816. The adhesive is configured to couple (e.g. fixedly couple or adhere) the second layer of composite material 818 to each of the first layer of composite material 812, the noodle 814, and the doubler 816. In some implementations, the adhesive is an epoxy-type adhesive. In other implementations, other type of adhesives can be used which can join composite materials.

A third layer of composite material 822 is coupled to the second surface 714 (e.g., the bottom surface) of the base 142. The composite material of the layers of composite material 812, 818, 822 may include or correspond to uncured composite material. In a particular implementation, the composite material of the layers of composite material 812, 818, 822 include uncured (e.g., "green") CFRP plies. The composite material of the layers of composite material 812, 818, 822 may include the same type of composite material or different types of composite material. The layers of composite material 812, 822 may include or correspond to facesheets, such as the facesheets 742, 744 of FIG. 7.

As illustrated in FIG. 8, the doubler 816 is tapered 862. To illustrated, the distal end 834 of the doubler 816 is thicker than the proximal end 832 of the doubler 816. FIG. 8 illustrates the aerodynamic surface 522 and 524 of FIG. 5. A portion of the cantilevered portion 144 forms a portion of the first aerodynamic surface 522 of the acoustic panel 132. For example, a portion of the surface of cantilevered portion 144 that is aftward or rearward of the transcowl 124 and extends in towards the aft of the acoustic panel 132 forms a portion of the first aerodynamic surface 522 of the acoustic panel 132.

Figure 9:
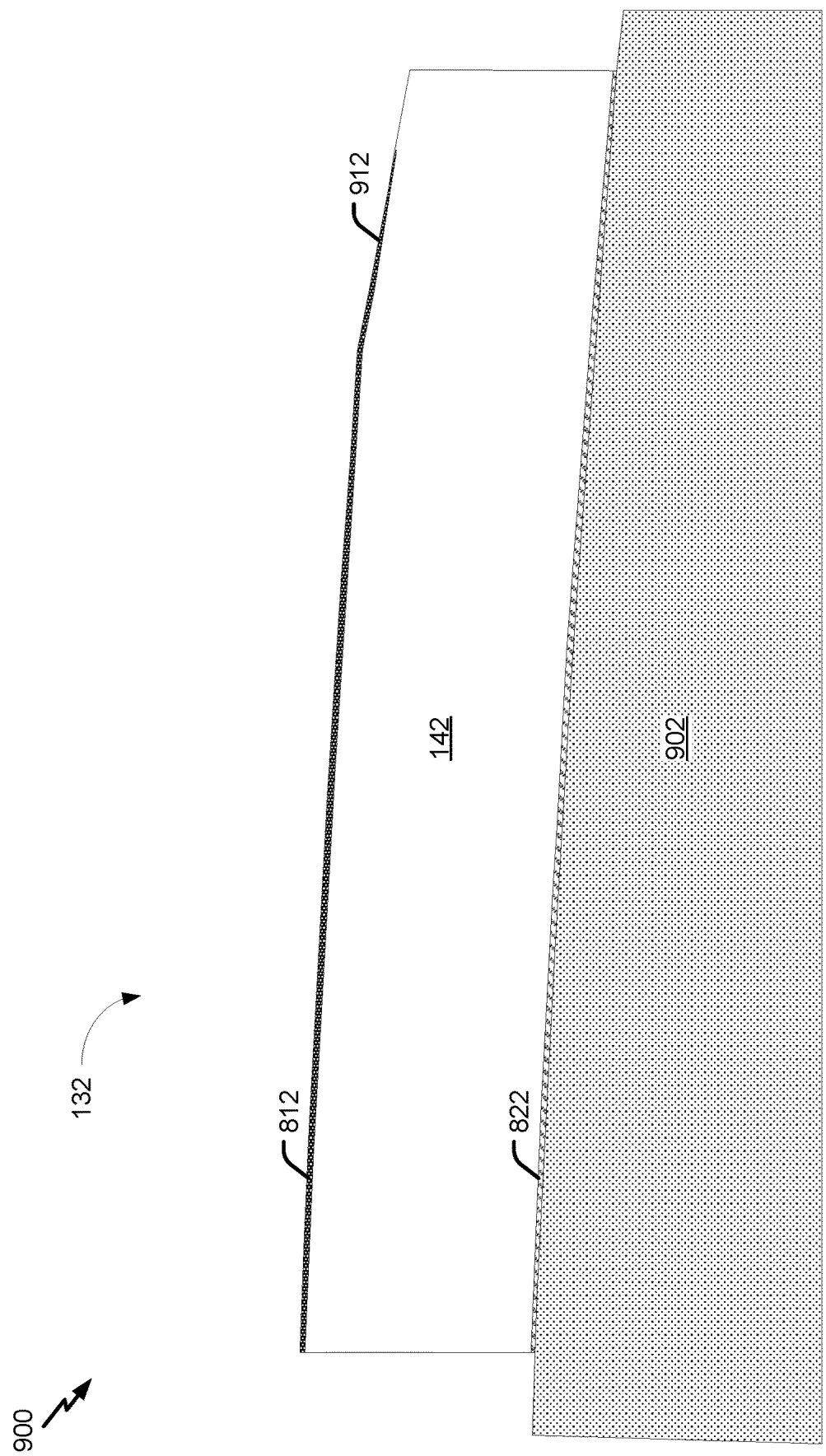
FIG. 9 is a diagram illustrating a first manufacturing stage of a process of manufacturing an acoustic panel.

FIG. 9 is a diagram 900 illustrating a first manufacturing stage of a process of manufacturing an acoustic panel 132 according to a particular aspect of the disclosure. The first manufacturing stage, as illustrated in FIG. 9, includes placing the base 142 on a tool 902 and depositing the first layer of composite material 812 on at least a portion of the base 142. As illustrated in FIG. 9, the first layer of composite material 812 has a tapered section 912 near an aft end of the first layer of composite material 812. In other implementations, the tapered section 912 may extend further forward or the entire layer of the composite material 812 may be tapered. Alternatively, the layer of composite material 812 may extend to the aft edge of the base 142. The first layer of composite material 812 may be applied or deposited by hand or by machine. In a particular implementation, the composite material of the first layer of composite material 812 is uncured (e.g., "green") CFRP plies.

The tool 902 is configured to support components of the acoustic panel 132 during layup and curing of the components of the acoustic panel 132. The tool 902 includes a geometry or shape that is configured to support formation of the acoustic panel 132 or components thereof. Although a single tool 902 is illustrated in FIGS. 9-13, multiple tools 902 may be used in other implementations.

In some implementations, the third layer of composite material 822 is deposited prior to depositing the first layer of composite material 812, as illustrated in FIG. 9. In other implementations, the third layer of composite material 822 is deposited after depositing the first layer of composite material 812. Applying the third layer of composite material 822 to the base 142 may be done similar to applying the first layer of composite material 812. For example, the third layer of composite material 822 is deposited on the tool 902 and the base 142 is applied on top of the third layer of composite material 822 or the base 142 is placed on the tool 902 or another tool and the third layer of composite material 822 is applied to the base 142 by hand or by machine. In a particular implementation, the first manufacturing stage further includes a curing step to cure the first layer of composite material 812, the third layer of composite material 822, or both. Alternatively, the first layer of composite material 812, the third layer of composite material 822, or both, can be cured during a later manufacturing stage. Additionally, the third layer of composite material 822 can be cured at an earlier manufacturing stage.

Figure 10:
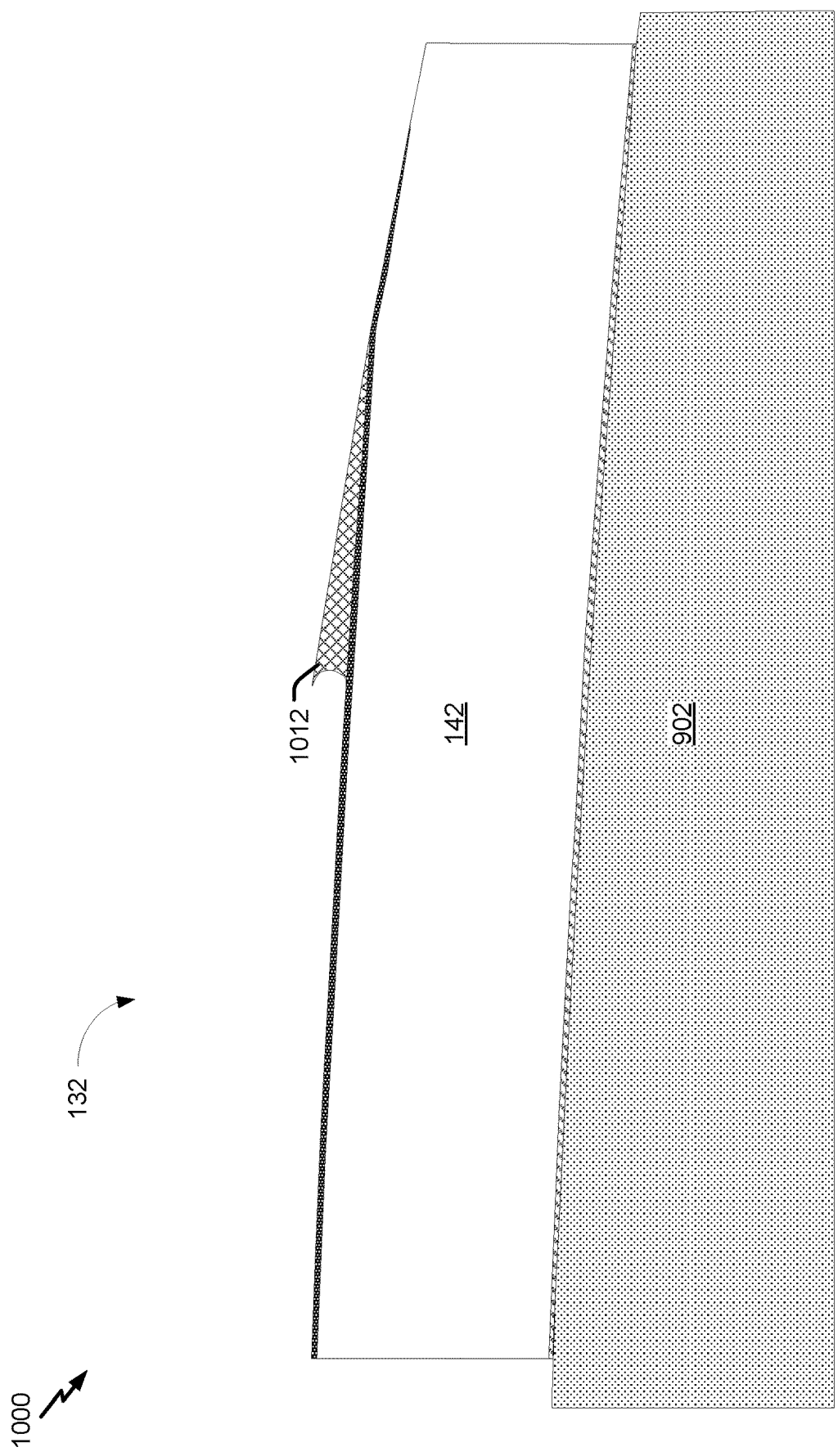
FIG. 10 is a diagram illustrating a second manufacturing stage of a process of manufacturing an acoustic panel.

FIG. 10 is a diagram 1000 illustrating a second manufacturing stage of a process of manufacturing the acoustic panel 132 according to a particular aspect of the disclosure. The second manufacturing stage illustrated in FIG. 10 may be subsequent to the first manufacturing stage of FIG. 9.

In the second manufacturing stage of FIG. 10, support material 1012 (which is cured to form the support member 146 of FIG. 1) is deposited or applied to the base 142. As illustrated in FIG. 10, the support material 1012 is deposited on and is in contact with the first layer of composite material 812. The support material 1012 may include or correspond to composite materials, such as uncured CFRP, or another material which has material properties similar to the composite materials. Alternatively, the support member 146 is placed or positioned on the base 142. In such implementations, the support member 146 is pre-cured, pre-formed, or machined prior to placement on the base 142. In a particular implementation, the second manufacturing stage further includes a curing step to cure the support material 1012, the first layer of composite material 812, the third layer of composite material 822, or a combination thereof. Alternatively, the support material 1012, the first layer of composite material 812, the third layer of composite material 822, or a combination thereof, can be cured during a later manufacturing stage.

Figure 11:
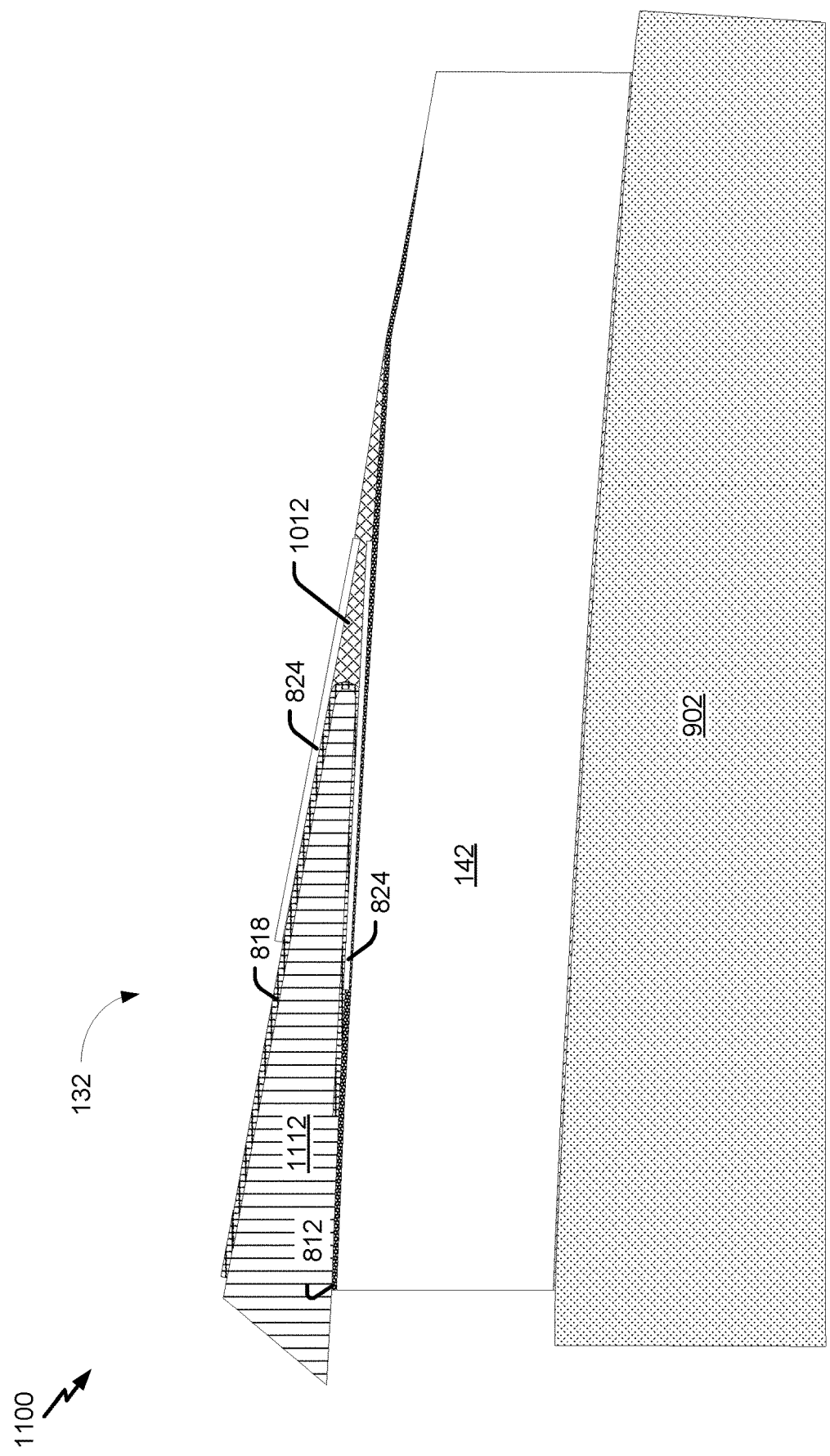
FIG. 11 is a diagram illustrating a third manufacturing stage of a process of manufacturing an acoustic panel.

FIG. 11 is a diagram 1100 illustrating a third manufacturing stage of a process of manufacturing the acoustic panel 132 according to a particular aspect of the disclosure. The third manufacturing stage illustrated in FIG. 11 may be subsequent to the second manufacturing stage of FIG. 10.

In the third manufacturing stage of FIG. 11, a layup support member 1112 and the second layer of composite material 818 are placed or positioned on the base 142. For example, the second layer of composite material 818 is applied to the layup support member 1112 and the joined layup support member 1112 and second layer of composite material 818 is positioned on the base 142 (e.g., positioned in the gap 820 illustrated in FIG. 8). As illustrated in FIG. 11, the second layer of composite material 818 is in contact with the layup support member 1112, the first layer of composite material 812, and the support member 146 or the support material 1012. The layup support member 1112 may include or correspond to a rubber material, as an illustrative, non-limiting example. The layup support member 1112 can include or correspond to other materials that can support composite materials under heat and/vacuum pressure without deforming outside of design tolerances. The layup support member 1112 is configured to support the second layer of composite material 818 and the cantilevered portion 144 prior to coupling the cantilevered portion to the base 142, as described with reference to FIG. 12.

In some implementations, the third manufacturing stage further includes applying the adhesive to at least a portion of an outside surface of the second layer of composite material 818. The adhesive may be applied to the second layer of composite material 818 before or after deposition of the second layer of composite material 818 onto the layup support member 1112. Additionally or alternatively, the adhesive is applied to first layer of composite material 812, the support material 1012, the support member 146, or another component that the second layer of composite material is coupled to. In a particular implementation, the third manufacturing stage further includes curing the second layer of composite material 818, the support material 1012, the first layer of composite material 812, the third layer of composite material 822, the adhesive, or a combination thereof. Alternatively, the second layer of composite material 818, the support material 1012, the first layer of composite material 812, the third layer of composite material 822, the adhesive, or a combination thereof, can be cured during a later manufacturing stage.

Figure 12:
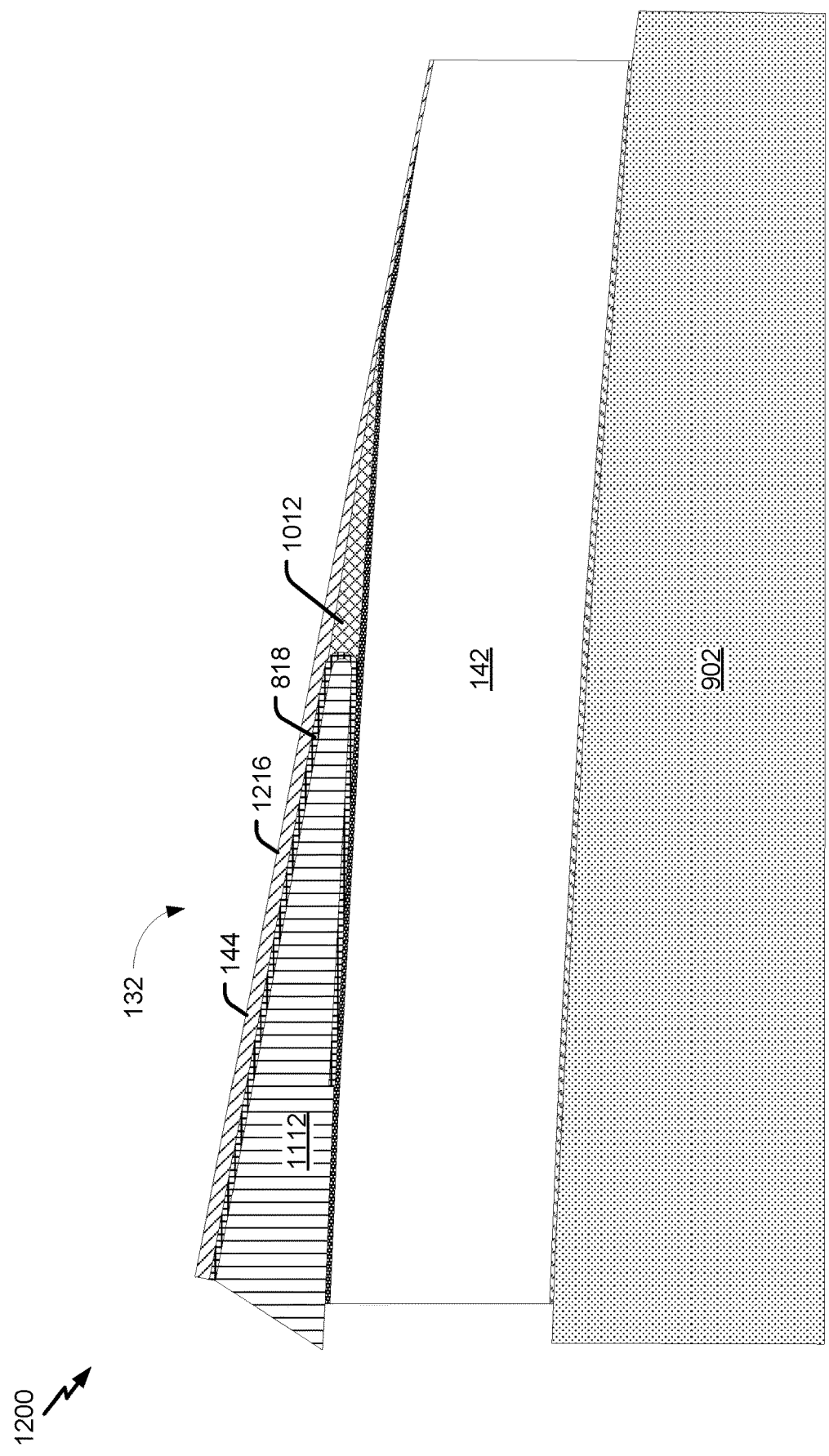
FIG. 12 is a diagram illustrating a fourth manufacturing stage of a process of manufacturing an acoustic panel.

FIG. 12 is a diagram 1200 illustrating a fourth manufacturing stage of a process of manufacturing the acoustic panel 132 according to a particular aspect of the disclosure. The fourth manufacturing stage illustrated in FIG. 12 may be subsequent to the third manufacturing stage of FIG. 11.

In the fourth manufacturing stage of FIG. 12, a pre-cured (pre-formed) composite component 1216 (e.g., the doubler 816) is placed on the base 142, the support member 146, and the layup support member 1112 to form the cantilevered portion 144 and the gap 820. The components are then cured to secure the pre-cured (pre-formed) composite component 1216 to the base 142 to form the doubler 816 and the cantilevered portion 144. For example, the components are cured in an autoclave or formed by a draping process (e.g., hot draping or vacuum deposition).

In other implementations, uncured composite material (referred to as second composite material) is deposited on the second layer of composite material 818, the support member 146 (e.g., the support material 1012), and/or the layup support member 1112 and is cured to form the cantilevered portion 144. To illustrate, second composite material is laid up on one or more of the support member 146 (e.g., the support material 1012) and the second layer of composite material 818 (which is supported by the layup support member 1112), and a rigid tool (e.g., a caul plate) is placed on top of the second composite material. Heat and pressure are applied to the caul plate during a curing process, and the caul plate transfers the heat and pressure to cure the second composite material. Additionally, curing the second composite material using the caul plate can be used to cure one or more layers of composite material 812, 818, 822, the support material 1012, or a combination thereof. In some such implementations, the layup support member 1112, the second layer of composite materials 818, or both, may extend to or past the distal portion of the cantilevered portion 144, as illustrated in FIG. 12.

In some implementations, the second layer of composite material 818 is formed such that the second layer of composite material 818 extends to the distal end 834 of the cantilevered portion 144 and the pre-cured (pre-formed) composite component 1216 and the second layer of composite material 818 is later reduced (e.g., by cutting or machining) such that the second layer of composite material 818 does not extend to the distal end 834 (similar to the second layer of composite material 818 of FIG. 8). In other implementations, the second layer of composite material 818 is formed such that it does not extend to distal end 834 of the cantilevered portion 144 and the pre-cured (pre-formed) composite component 1216.

Figure 13:
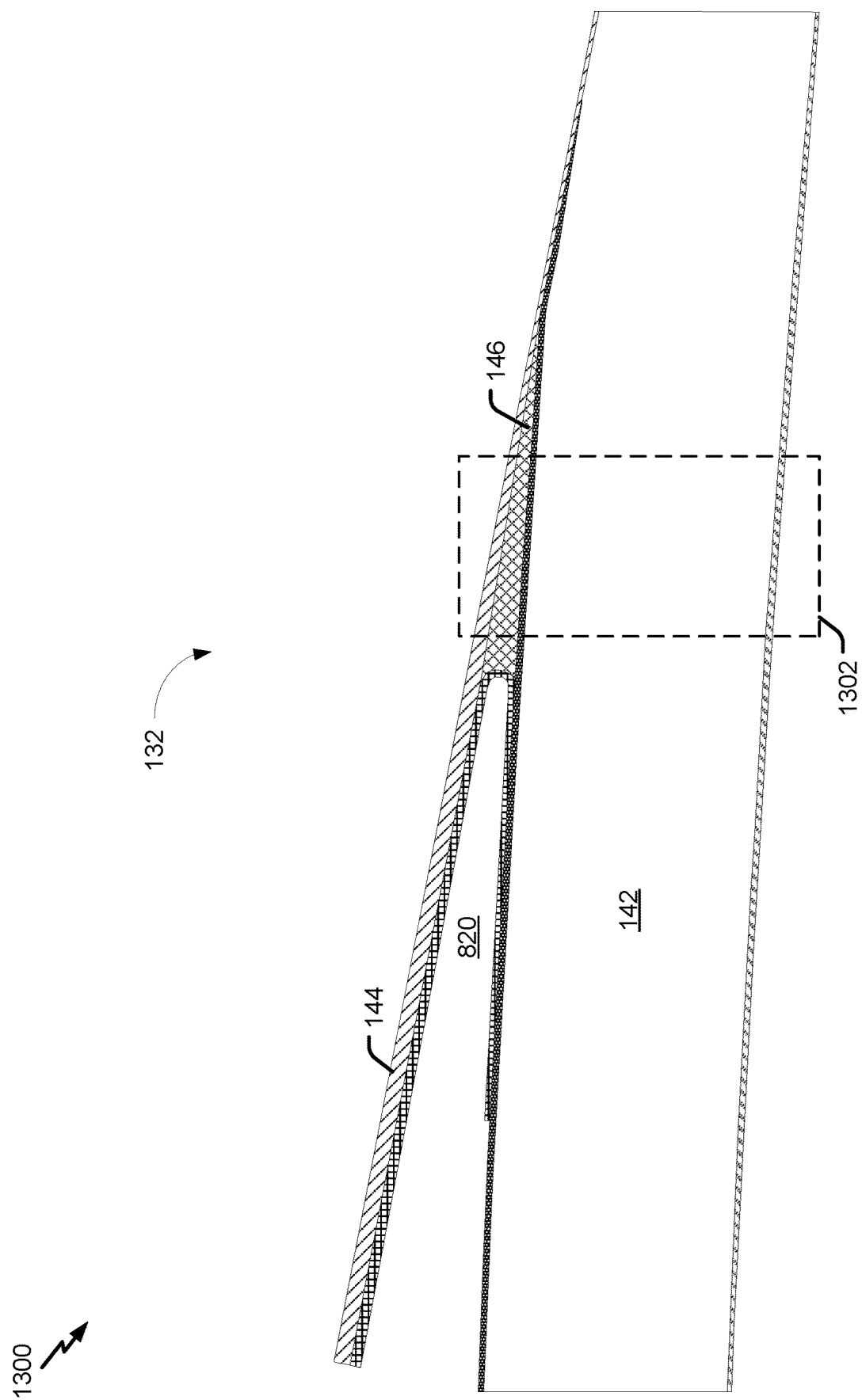
FIG. 13 is a diagram illustrating a fifth manufacturing stage of a process of manufacturing an acoustic panel.

FIG. 13 is a diagram 1300 illustrating a fifth manufacturing stage of a process of manufacturing the acoustic panel 132 according to a particular aspect of the disclosure. The fifth manufacturing stage illustrated in FIG. 13 may be subsequent to the fourth manufacturing stage of FIG. 12.

In the fifth manufacturing stage of FIG. 13, after acoustic panel 132 is joined by curing, the layup support member 1112 is removed and the gap 820 is formed. In some implementations, the acoustic panel 132 is machined after curing. In some implementations, the third layer of composite material 822 is deposited after the layup support member 1112 is removed. In other implementations, the third layer of composite material 822 is deposited prior to the layup support member 1112 being removed. For example, the third layer of composite material 822 may be deposited on the base 142 prior to the first manufacturing stage or prior to the fifth manufacturing stage.

Figure 17:
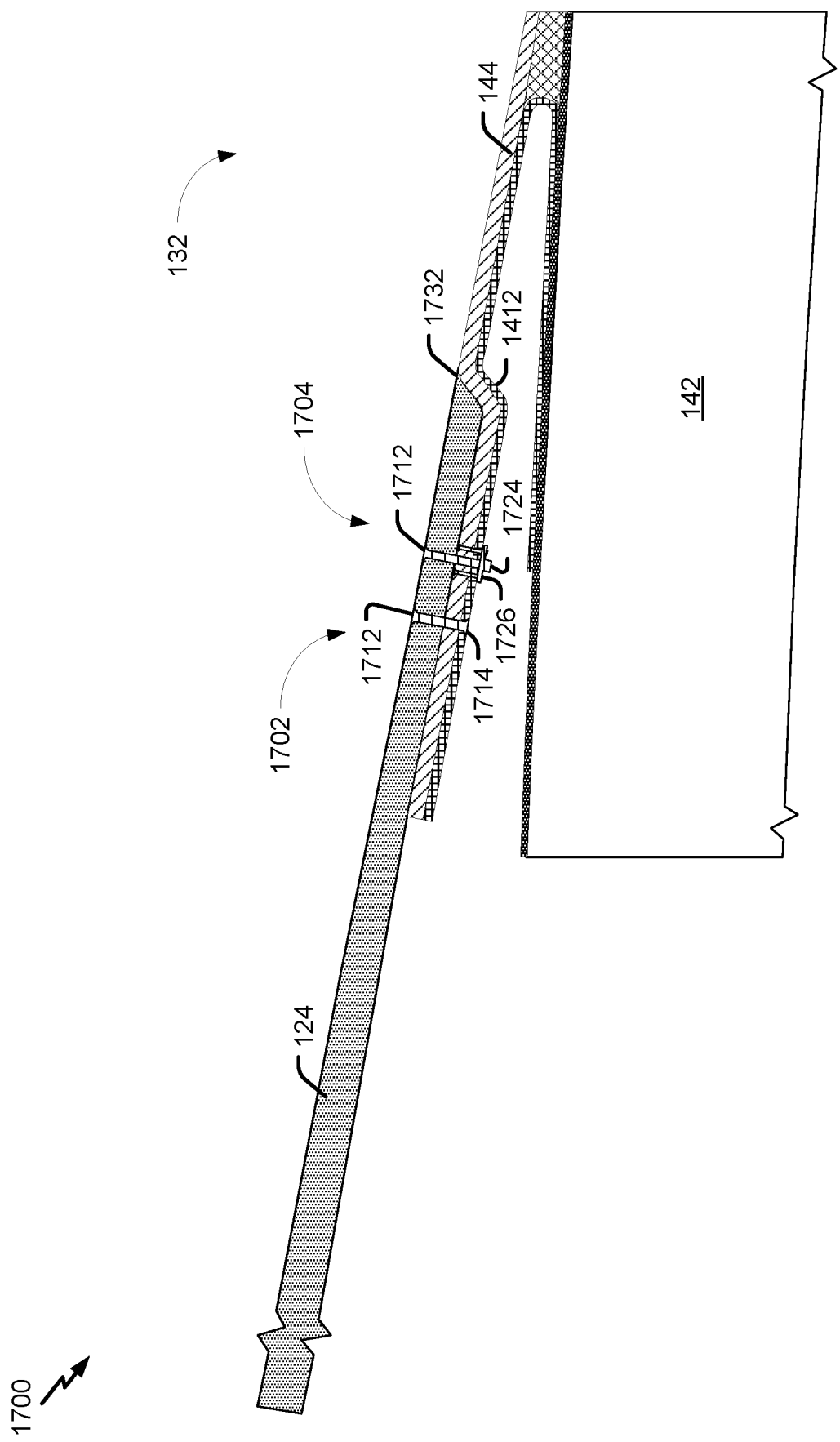
FIG. 17 is a diagram that illustrates a cross-section view of example couplings between the acoustic panel and the transcowl.

Additionally or alternatively, fasteners or fastener supports are placed on the cantilevered portion 144, as described further with reference to FIG. 17. By coupling the cantilevered portion 144 to another component, as opposed to coupling the other component to the base 142, an acoustically active area of the base 142 is increased. To illustrate, the base 142 has an additional acoustically active area indicated by an area within a dashed box 1302 of FIG. 13 as compared to acoustic panels which couple the acoustic panel 132 to another component by using fasteners in the area within the dashed box 1302. Special blind permanent fasteners can limit acoustic area losses initially, but lose that performance if the panels are separated for maintenance and servicing.

Figure 14:
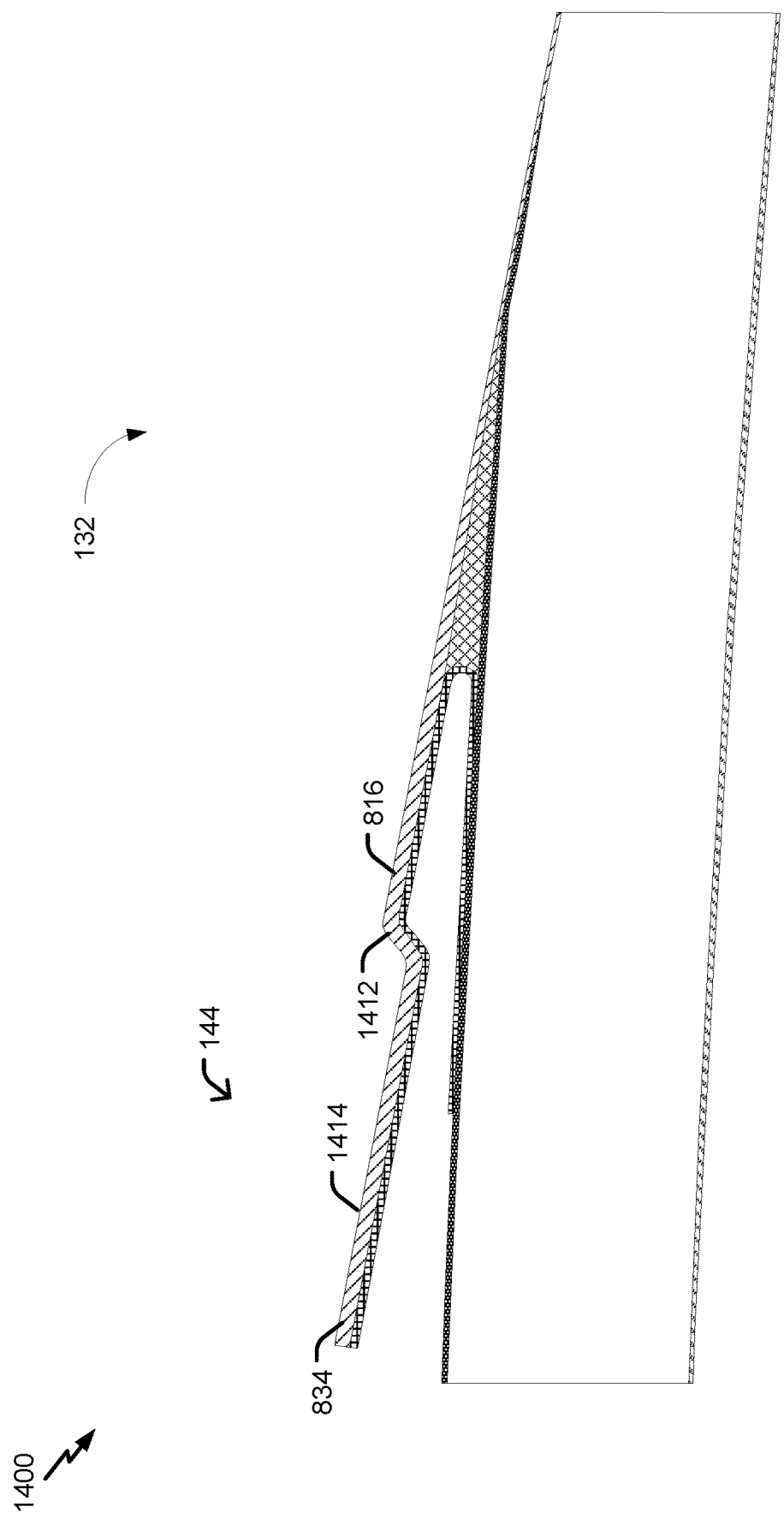
FIG. 14 is a diagram that illustrates a cross-section view of another example of the aft portion of the acoustic panel of FIG. 3.

FIG. 14 is a diagram 1400 that illustrates a cross-section view of another example of the aft portion 534 of the acoustic panel 132 of FIG. 3. As illustrated in FIG. 14, the doubler 816 and the cantilevered portion 144 include a joggle 1412 (e.g., a notch or faired in portion). The joggle 1412 provides a recessed portion 1414 (recessed surface) for coupling with another component to form an aerodynamic surface. The recessed portion 1414 provides for a smoother transition between an exterior surface of the cantilevered portion 144 and an exterior surface of the other component to which the cantilevered portion 144 is attached. In a particular implementation no aerodynamic seal is used between the other component and the acoustic panel 132 or a size of an aerodynamic seal between the other component and the acoustic panel 132 is reduced.

Figure 15:
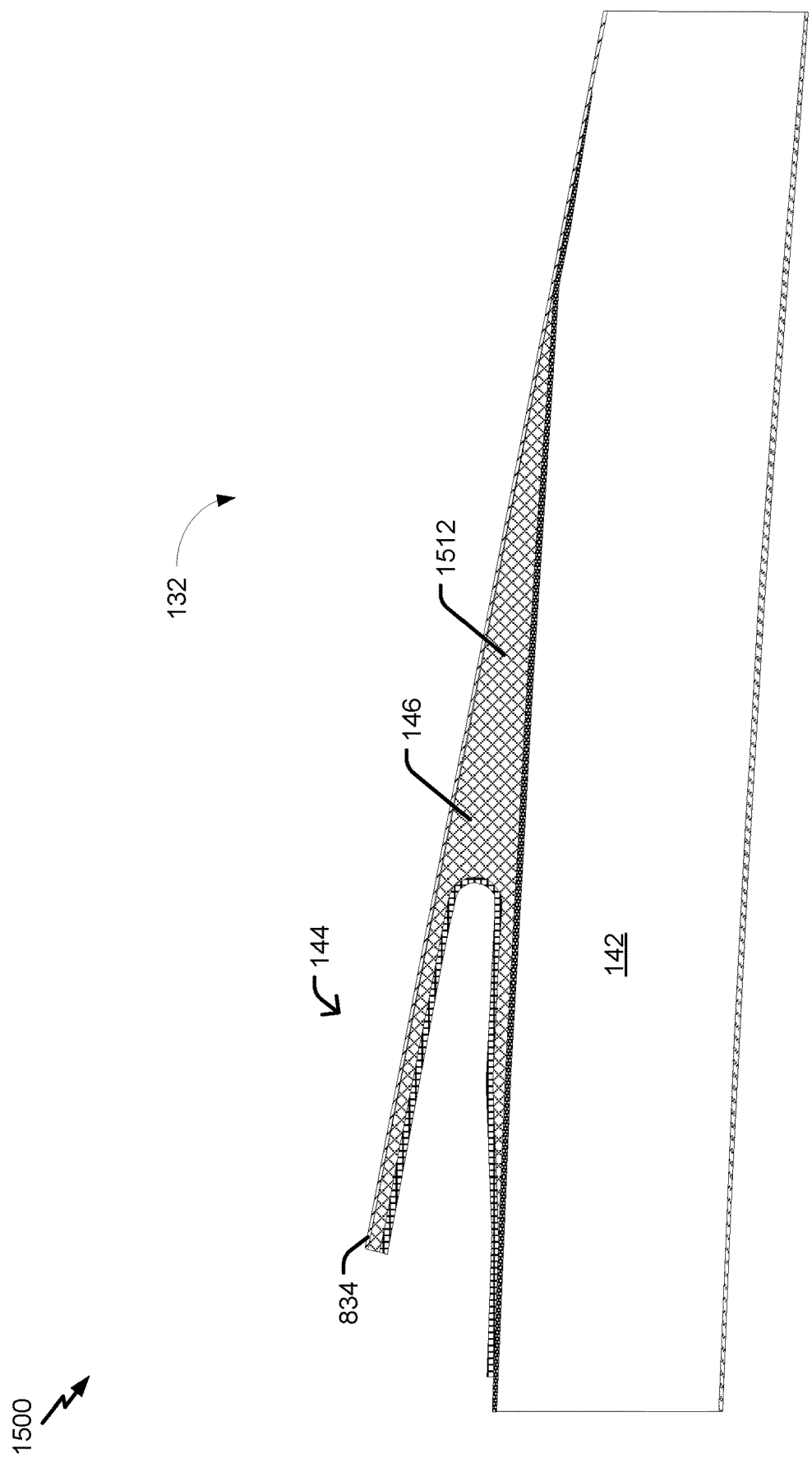
FIG. 15 is a diagram that illustrates a cross-section view of another example of the aft portion of the acoustic panel of FIG. 3.

FIG. 15 is a diagram 1500 that illustrates a cross-section view of another example of the aft portion 534 of the acoustic panel 132 of FIG. 3. As compared to the example acoustic panels 132 of FIGS. 13 and 14 which have a noodle 814 for the support member 146, the acoustic panel 132 of FIG. 15 has a molded insert 1512 for the support member 146. In a particular implementation, the molded insert 1512 includes or corresponds to a thermoplastic material or a thermoset polymer material.

As illustrated in FIG. 15, the molded insert 1512 is larger than the noodle 814 and extends further towards the distal end 834 than the noodle 814 of FIGS. 8 and 14. Although the molded insert 1512 extends to the distal end 834 in the example illustrated in FIG. 15, in other implementations the molded insert 1512 does not extend all the way to the distal end 834.

As illustrated in FIG. 15, the second layer of composite material 818 is larger (longer) and extends further towards the distal end 834 than the second layer of composite material 818 of FIG. 8. Although the second layer of composite material 818 extends to the distal end 834 in the example illustrated in FIG. 15, in other implementations, the second layer of composite material 818 does not extend all the way to the distal end 834.

As illustrated in FIG. 15, the pre-cured composite component 1216 (e.g., the doubler 816) is thinner than the pre-cured composite component 1216 (e.g., the doubler 816) of FIGS. 13 and 14. The pre-cured composite component 1216 (e.g., the doubler 816) of FIG. 15 has a substantially constant cross-section and thickness (i.e., does not taper), as compared to the tapered pre-cured composite component 1216 (e.g., the doubler 816) of FIGS. 13 and 14.

Figure 16:
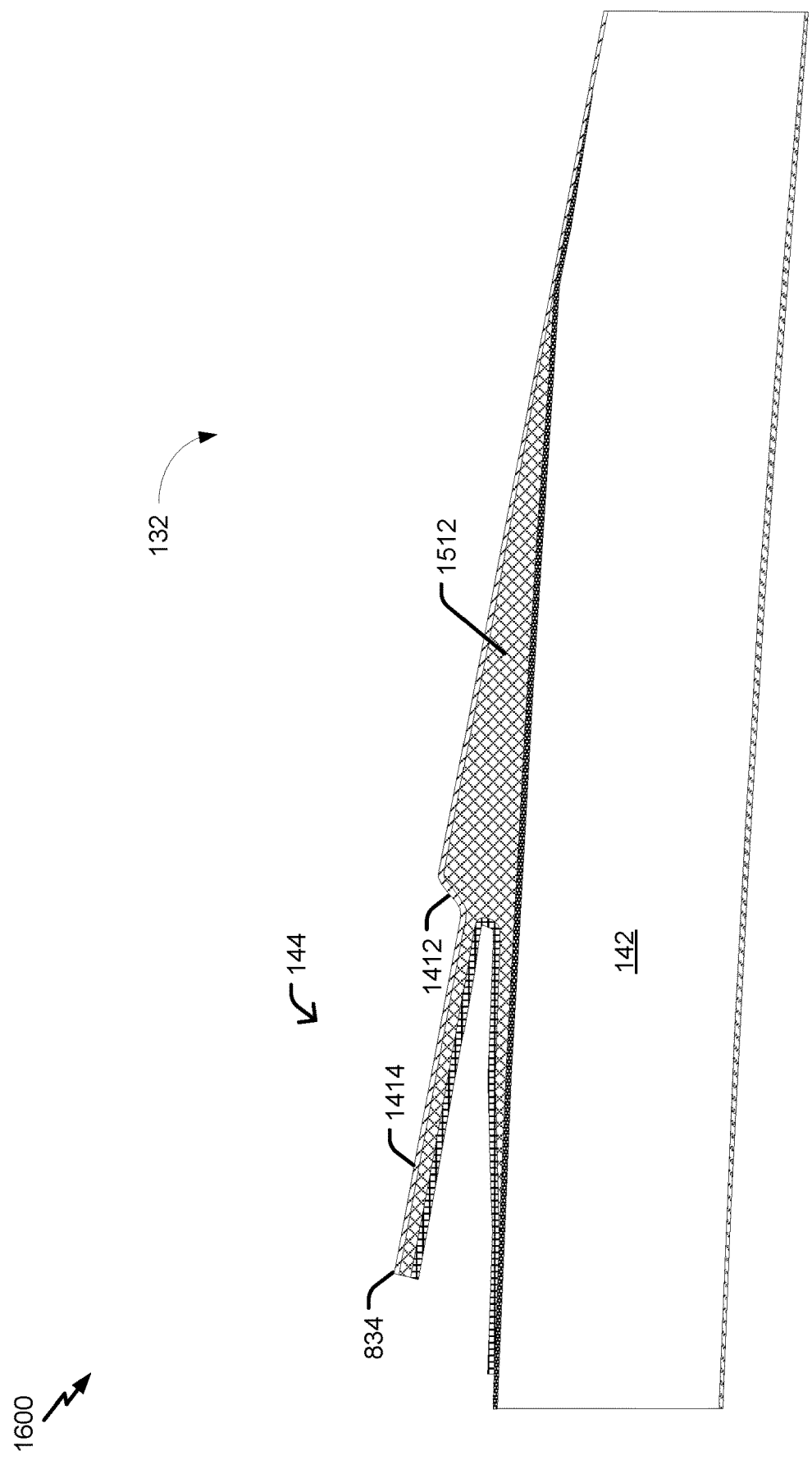
FIG. 16 is a diagram that illustrates a cross-section view of another example of the aft portion of the acoustic panel of FIG. 3.

FIG. 16 is a diagram 1600 that illustrates a cross-section view of another example of the aft portion 534 of the acoustic panel 132 of FIG. 3. Similar to the example acoustic panel 132 of FIG. 15, the acoustic panel 132 of FIG. 16 has a molded insert 1512 for the support member 146. As compared to the example acoustic panels 132 of FIGS. 13 and 15, the cantilevered portion 144 of the acoustic panel 132 of FIG. 16 is joggled. To illustrate, the acoustic panel 132 includes a joggle 1412 and a recessed receiving portion 1414, similar to the cantilevered portion 144 of the acoustic panel 132 of FIG. 14.

As illustrated in FIG. 16, the second layer of composite material 818 is larger (longer) and extends further towards the distal end 834 than the second layer of composite material 818 of FIG. 8. Although the second layer of composite material 818 extends to the distal end 834 in the example illustrated in FIG. 16, in other implementations, the second layer of composite material 818 does not extend all the way to the distal end 834.

Similar to the pre-cured composite component 1216 (e.g., the doubler 816) of FIG. 15, the pre-cured composite component 1216 (e.g., the doubler 816) of FIG. 16 has a substantially constant cross-section and thickness (i.e., does not taper). The acoustic panels 132 of FIGS. 14-17 may be manufactured similar to the acoustic panel 132 of FIG. 8, e.g., by one of more of the manufacturing stages illustrated in FIGS. 9-13. In some implementations, the acoustic panels 132 of FIGS. 14-16 include the adhesive, as described with reference to FIGS. 8 and 11.

FIG. 17 is a diagram 1700 that illustrates a cross-section view of an example coupling between the cantilevered portion 144 of the acoustic panel 132 of FIG. 3 and the transcowl 124 of FIG. 1. In FIG. 17, two example couplings are illustrated using different types of fastener assemblies 1702, 1704. A first coupling includes a first fastener assembly 1702 extending through the transcowl 124 and the cantilevered portion 144. As an illustrative, non-limiting example, the first fastener assembly 1702 includes a bolt 1712 and a nut 1714. In a particular implementation, the bolt 1712 and the nut 1714 include or correspond to flush head bolt and nut or a double-flush head bolt and nut. In such implementations, a technician (or two technicians) may require access to both the top surface and bottom surface (e.g., access to the gap 820) to fasten and unfasten (remove) the first fastener assembly 1702.

A second coupling includes a second fastener assembly 1704, such as a nut plate 1724, rivets 1726, and the bolt 1712. In the second coupling, the bolt 1712 extends through the transcowl 124 and the cantilevered portion 144. The nut plate 1724 is coupled to the cantilevered portion 144 by fasteners (e.g., the rivets 1726, screws, etc.) or adhesive or is fixed to the cantilevered portion 144 during curing. In such implementations, the transcowl 124 can be decoupled from the acoustic panel 132 without access to the gap 820.

The transcowl 124 may be coupled to the cantilevered portion 144 using one or more first fastener assemblies 1702, one or more second fastener assemblies 1704, or a combination thereof. Although the first fastener assembly 1702 is illustrated as extending through the middle of the cantilevered portion 144 (e.g., the doubler 816), the first fastener assembly 1702 (e.g., the bolt 1712 thereof) may extend through the proximal portion of the cantilevered portion (e.g., extend through the doubler 816 and the second layer of composite material 818).

In the implementation illustrated in FIG. 17, the cantilevered portion 144 includes the joggle 1412 and the transcowl 124 has a shape complementary to a shape of the joggle 1412 to form a smooth aerodynamic transition at an area 1732 near the joggle 1412. In such implementations, an aerodynamic filler is not utilized or a size of the aerodynamic filler is reduced. The aerodynamic transition is relatively smoother and imparts less drag than aerodynamic transitions between the transcowl 124 and cantilevered portion 144 without a joggle 1412, such as a cantilevered portion having a cross-section that is substantially straight or is straight in a longitudinal axis (e.g., fore to aft). In other implementations, the acoustic panel 132 is coupled to another component of a nacelle, a vehicle, or an aircraft, such as the aircraft 100 of FIG. 1.

Figure 18:
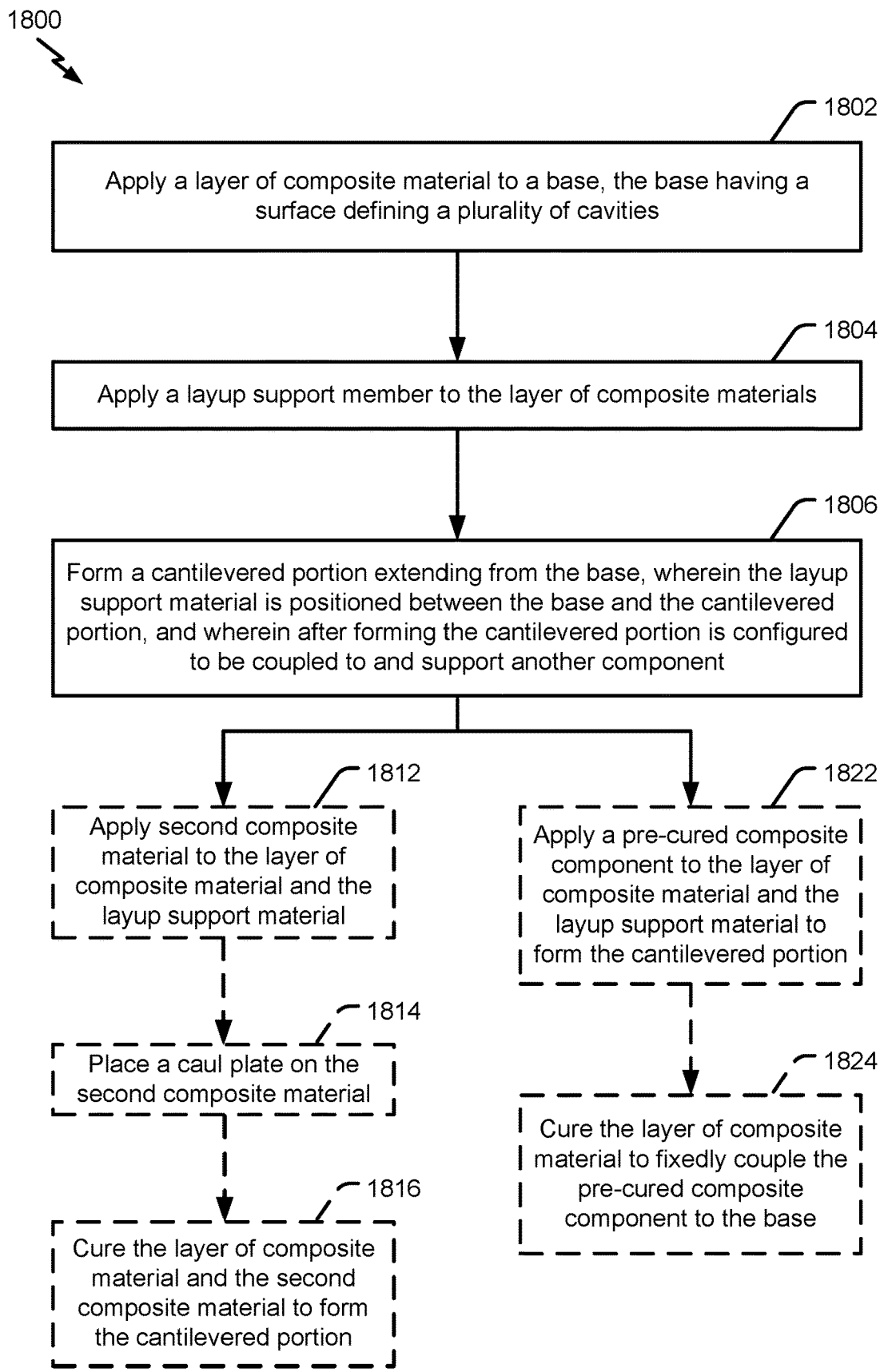
FIG. 18 is a flow chart of an example of a method of manufacturing an acoustic panel.

FIG. 18 illustrates a particular example of a method 1800 for controlling generating an acoustic panel, such as the acoustic panel 132 of FIG. 1. The method 1800 may be performed by computer (e.g., a controller of a composite part fabrication system).

The method 1800 includes, at 1802, applying a layer of composite material to a base, the base having a surface defining a plurality of cavities. For example, the layer of composite material may include or correspond to the first layer of composite material 812 of FIG. 8 or the second layer of composite material 818 of FIG. 8. The base may include or correspond to the base 142 of FIG. 1. To illustrate, the first layer of composite material 812 is deposited (e.g., directly deposited) on the base 142 or the second layer of composite material 818 is deposited on the base 142 and is in contact with the first layer of composite material 812.

The method 1800 includes, at 1804, applying a layup support member to the layer of composite materials. For example, the layup support member may include or correspond to the layup support member 1112 of FIG. 11. To illustrate, the layup support member 1112 is placed on the base 142 (or the first layer of composite material 818) before curing (e.g., by a first cure or a second cure) the pre-cured composite component 1216 to the base 142, as described with reference to FIG. 12.

The method 1800 also includes, at 1806, forming a cantilevered portion extending from the base. The layup support material is positioned between the base and the cantilevered portion. After forming the cantilevered portion, the cantilevered portion is configured to be coupled to and support another component. A portion of a surface of the cantilevered portion is an aerodynamic surface, as described with reference to FIG. 8. FIG. 18 illustrates two exemplary method of forming 1806 the cantilevered portion 144 in dashed boxes.

In some implementations, forming 1806 includes applying 1812 second composite material to the layer of composite material and the layup support member. The layup support material is positioned between the base and the second composite material. The second composite material may include or correspond to uncured (e.g., "green") CFRP plies, as described with reference to FIG. 11. For example, the uncured CFRP plies are placed (laid-up) on the support material 1012 and the second layer of composite material 818 (which is supported by the layup support member 1112).

In such implementations, forming 1806 also includes placing 1814 a caul plate on the second composite material and curing 1816 the layer of composite material and the second composite material to form the cantilevered portion. To illustrate, a caul plate is placed on top of the uncured CFRP plies. Heat and pressure are applied to the caul plate which transfers the heat and pressure to cure the uncured CFRP plies and one or more layers of composite material 812, 818 to form the cantilevered portion 144 and secure it to the base 142. After curing, the caul plate is removed.

In other implementations, forming 1806 includes applying 1822 a pre-cured composite component to the layer of composite material and the layup support member to form a cantilevered portion extending from the base. The layup support member is positioned between the base and the cantilevered portion. For example, the pre-cured composite component may include or correspond to the cantilevered portion 144 of FIG. 1, the doubler 816 of FIG. 8, the pre-cured composite component 1216 of FIG. 1, or a combination thereof. To illustrate, the pre-cured composite component 1216 is placed on the layup support member 1112 and the support member 146 or the support material 1012, as described with reference to FIG. 12. Curing one or more layers of composite material 812, 818 affixes the pre-cured composite component 1216 to the base 142 to form the doubler 816 which includes a portion that is attached to the base 142 (e.g., via the first layer of composite material 812) and a portion that extends from the base 142, i.e., the cantilevered portion 144.

In such implementations where the pre-cured composite component is used, forming 1806 further includes curing 1824 the layer of composite material to fixedly couple the pre-cured composite component to the base. For example, heat and pressure is applied to cure the first layer of composite material 812, the second layer of composite material 818, or both, to fixedly adhere the pre-cured composite component 1216 to the base 142, as described with reference to FIG. 12.

Adhering the pre-cured composite component 1216 to the base 142 generates a cantilevered portion 144 for joining another component (e.g., a portion of the transcowl 124) and enlarges an active acoustic area of the base 142 (e.g., prevents reduction of an acoustically active area caused by fasteners joining the acoustic panel 132 and the other component). Additionally, the acoustic panel 132 may be easily disconnected from the other component because of the use of fasteners not penetrating the base 142 (as opposed to adhesives, such as fasteners assemblies 1702, 1704) which improves repairability, aerodynamic performance, and acoustic performance (especially after repair or maintenance of the nacelle that requires disassembly to the acoustic panel 132 and the transcowl 124).

In some implementations, the cantilevered portion is fixedly coupled or fixedly adhered to the base. Additionally, the support member may be fixedly coupled or fixedly adhered to the base, the cantilevered portion, or both. For example, the base 142, the cantilevered portion 144, and the support member 146 form a monolithic structure.

In some implementations, one or more fasteners extend through the cantilevered portion and the portion of the transcowl to couple the cantilevered portion to the portion of the transcowl. For example, one or more nut plates 1724 are fastened to the cantilevered portion 144, and the cantilevered portion 144 is joined with the portion of the transcowl 124 via bolts 1712 extending through the portion of the transcowl 124 and threading with the nut plate 1724.

In some implementations, the plurality of cavities, such as the plurality of cavities 722 of FIG. 7B, have a hexagonal shape (e.g., a honeycomb shape). In other implementations, the plurality of cavities has a circular shape, a rectangular shape, a square shape, a pentagonal shape, an octagonal shape, or a combination thereof, as described with reference to FIG. 7B.

In some implementations, the cantilevered portion has a joggled portion to receive the portion of the transcowl. For example, the cantilevered portion 144 is a joggled, notched, or faired in cantilevered portion 144 (e.g., includes the joggle 1412) and maintains aerodynamic smoothness when coupled with the transcowl 124, as illustrated in FIGS. 14 and 17. In other implementations, the cantilevered portion 144 has a longitudinal cross-section that is substantially straight or is straight in a longitudinal axis (e.g., fore to aft), as illustrated in FIGS. 8 and 15. Additional or alternatively, the cantilevered portion 144 is tapered, as illustrated in FIGS. 8 and 14. For example, the distal end 834 of the doubler 816 (or the pre-cured composite component 1216) is thicker than the proximal end 832 of the doubler 816 (or the pre-cured composite component 1216).

In some implementations, the support member includes or corresponds to a noodle, such as the noodle 814 of FIGS. 8 and 14. In a particular implementation, the noodle 814 includes or corresponds to a material having a similar elasticity to carbon fiber reinforced polymer of the cantilevered portion 144. In other implementations, the support member includes or corresponds to a molded insert, such as the molded insert 1512 of FIGS. 15 and 16. In a particular implementation, the molded insert includes or corresponds to a thermoplastic material or a thermoset polymer material.

In some implementations, the engine (e.g., the propulsor 112) is configured to generate thrust, and the thrust reversal assembly (e.g., the thrust reverser 116) is configured to redirect a portion of the thrust generated by the engine to generate second thrust (and/or increase drag) that partially opposes the thrust, as described with reference to FIG. 1.

In some implementations, the method 1800 further includes removing the layup support member and inserting a support material into a cavity positioned between the layer of composite material and the cantilevered portion, as described with reference to FIGS. 10 and 13.

In some implementations, the method 1800 further includes applying a second layer of composite material to the layer of composite material, the support material, and the cantilevered portion and curing the second layer of composite material to couple the cantilevered portion (e.g., the pre-cured composite component), the support material, and the layer of composite material, as described with reference to FIGS. 11-13.

In some implementations, the layer of composite material is applied to a first surface of the base. In some such implementations, the method 1800 further includes applying a third layer of composite material to a second surface of the base. The second surface opposite the first surface and corresponding to a first aerodynamic surface. The first surface and a surface of the cantilevered portion (e.g., the pre-cured composite component) correspond to a second aerodynamic surface, as described with reference to FIGS. 5, 8, and 9.

In some implementations, the method 1800 further includes, prior to applying the pre-cured composite component to the base applying carbon fiber reinforced polymer to a tool and curing (or partially curing) the carbon fiber reinforced polymer to generate the pre-cured composite component, as described with reference to FIG. 12. In a particular implementation, the pre-cured composite component (or doubler) is tapered, as described with reference to FIG. 8.

The methods 1800 of FIG. 18 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1800 of FIG. 18 can be initiated or controlled by one or more processors, such as one or more processors included in a control system. In some implementations, a portion of the method 1800 of FIG. 18 may be combined with a second portion of the method 1800 of FIG. 18. Additionally, one or more operations described with reference to FIG. 18 may be optional and/or may be performed in a different order than shown or described. Two or more operations described with reference to FIG. 18 may be performed at least partially concurrently.

Figure 19:
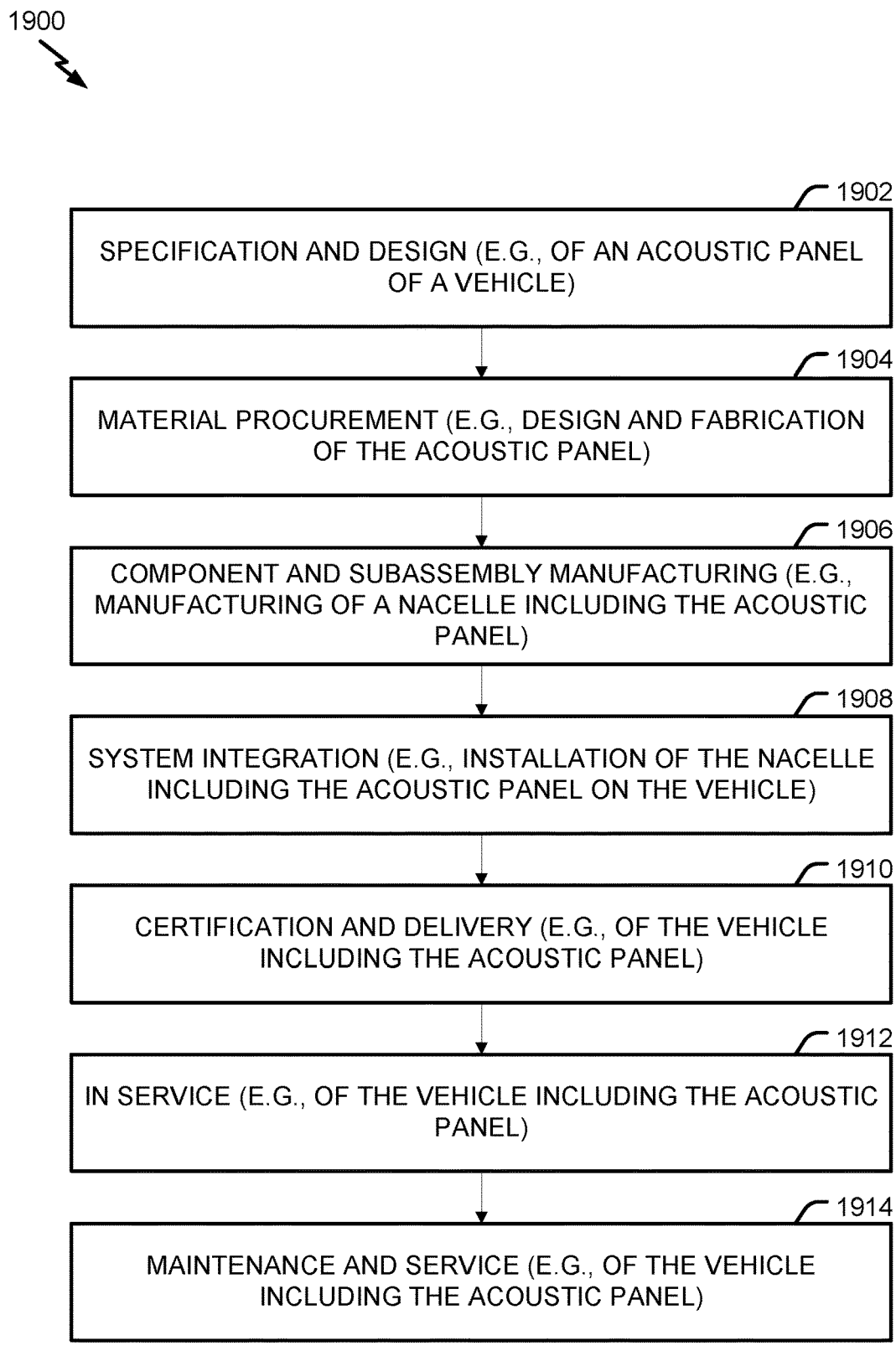
FIG. 19 is a flow chart of an example of a method of acoustic panel manufacturing and service.
Figure 20:
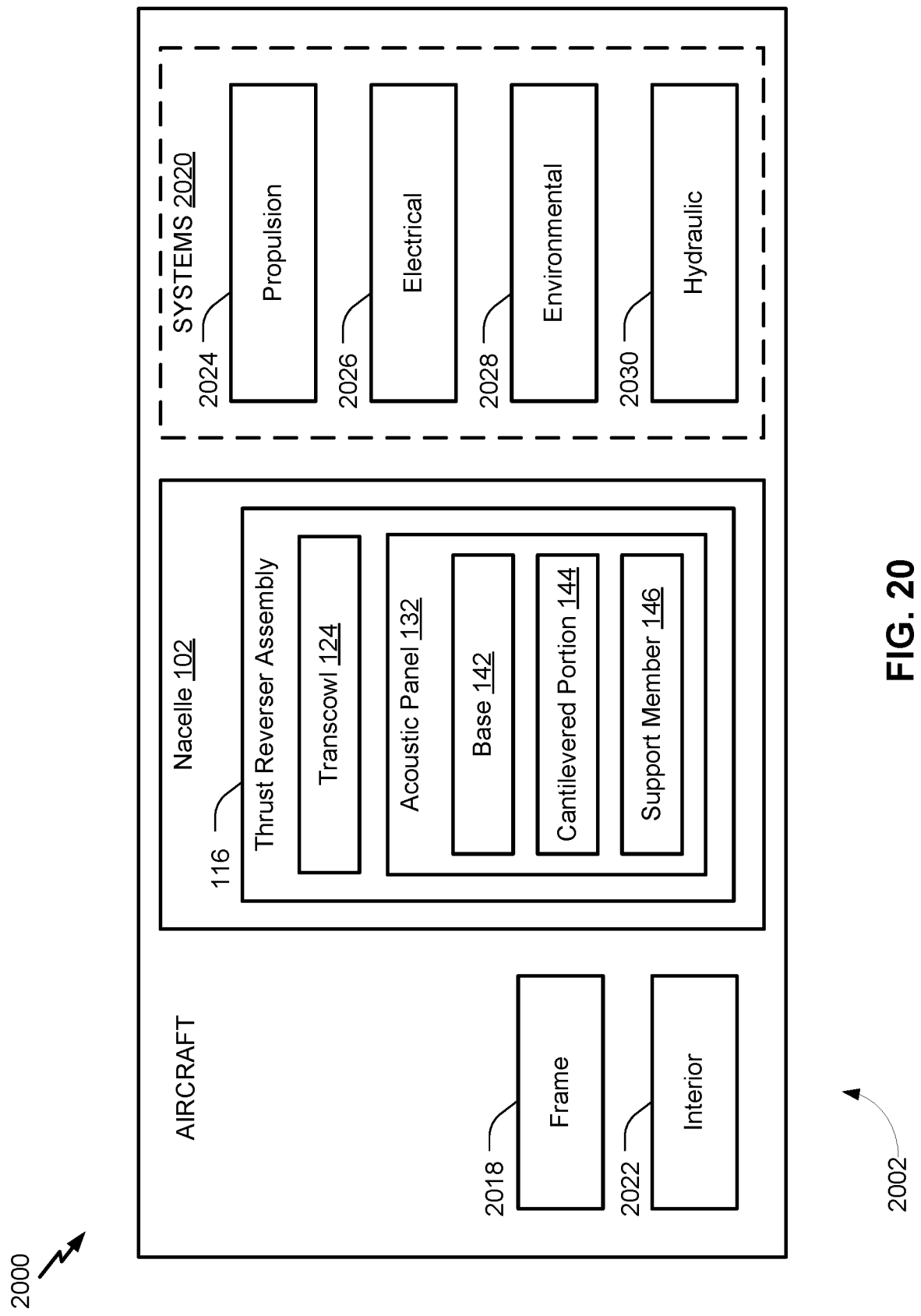
FIG. 20 is a block diagram that illustrates an example of a vehicle including an acoustic panel.

Referring to FIGS. 19 and 20, examples of the disclosure are described in the context of a vehicle manufacturing and service method 1900 as illustrated by the flow chart of FIG. 19 and a vehicle 2002 as illustrated by the block diagram 2000 of FIG. 20. A vehicle produced by the vehicle manufacturing and service method 1900 of FIG. 19, such as the vehicle 2002 of FIG. 20, may include an aircraft, an airship, a rocket, a satellite, a submarine, or another vehicle, as illustrative, non-limiting examples. The vehicle 2002 may be manned or unmanned (e.g., a drone or an unmanned aerial vehicle (UAV)).

Referring to FIG. 19, a flowchart of an illustrative example of a method of acoustic panel manufacturing and service is shown and designated 1900. During pre-production, the exemplary method 1900 includes, at 1902, specification and design of a vehicle, such as a vehicle 2002 described with reference to FIG. 20. During the specification and design of the vehicle 2002, the method 1900 may include specifying a design of an acoustic panel, such as the acoustic panel 132 of FIG. 1. At 1904, the method 1900 includes material procurement. For example, the method 1900 may include procuring materials for the acoustic panel 132 of the vehicle 2002.

During production, the method 1900 includes, at 1906, component and subassembly manufacturing and, at 1908, system integration of the vehicle 2002. The method 1900 may include component and subassembly manufacturing (e.g., manufacturing the acoustic panel 132 of FIG. 1) of the vehicle 2002 and system integration (e.g., coupling the acoustic panel 132 of FIG. 1 to one or more components of the vehicle 2002, such as the transcowl 124). At 1910, the method 1900 includes certification and delivery of the vehicle 2002 and, at 1912, placing the vehicle 2002 in service. Certification and delivery may include certifying the acoustic panel 132 of FIG. 1 by inspection or non-destructive testing. While in service by a customer, the vehicle 2002 may be scheduled for routine maintenance and service (which may also include modification, reconfiguration, refurbishment, and so on). At 1914, the method 1900 includes performing maintenance and service on the vehicle 2002. The method 1900 may include performing maintenance and service of the propulsor 112, the thrust reverser 116, or the acoustic panel 132 of FIG. 1. For example, maintenance and service of the propulsor 112 may include decoupling the acoustic panel 132 from the transcowl 124 or replacing the acoustic panel 132.

Each of the processes of the method 1900 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

Referring to FIG. 20, a block diagram 2000 of an illustrative implementation of the vehicle 2002 that includes an acoustic panel, such as the acoustic panel 132 of FIG. 1. To illustrate, the vehicle 2002 may include an aircraft, such as the aircraft 100 of FIG. 1, as an illustrative, non-limiting example. The vehicle 2002 may have been produced by at least a portion of the method 1900 of FIG. 19. As shown in FIG. 20, the vehicle 2002 (e.g., the aircraft 100 of FIG. 1) includes an airframe 2018, an interior 2022, the nacelle 102, and a plurality of systems 2020. The plurality of systems 2020 may include one or more of a propulsion system 2024, an electrical system 2026, an environmental system 2028, or a hydraulic system 2030. The nacelle 102 includes the acoustic panel 132, and the acoustic panel 132 includes the base 142, the cantilevered portion 144, and the support member 146. The acoustic panel 132 may be manufactured by one or more steps of the method 1800 of FIG. 18 and/or as described with reference to FIGS. 9-13.

Apparatus and methods included herein may be employed during any one or more of the stages of the method 1900 of FIG. 19. For example, components or subassemblies corresponding to production process 1908 may be fabricated or manufactured in a manner similar to components or subassemblies produced while the vehicle 2002 is in service, at 1912 for example and without limitation. Also, one or more apparatus implementations, method implementations, or a combination thereof may be utilized during the production stages (e.g., stages 1902-1910 of the method 1900), for example, by substantially expediting assembly of or reducing the cost of the vehicle 2002. Similarly, one or more of apparatus implementations, method implementations, or a combination thereof, may be utilized while the vehicle 2002 is in service, at 1912 for example and without limitation, to maintenance and service, at 1914.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An acoustic panel comprising:
a base having a surface defining a plurality of cavities configured to attenuate noise from an engine, wherein the base includes a first side;
a cantilevered portion extending from the base and configured to be removably coupled with a portion of a transcowl, wherein the cantilevered portion includes a second side, and wherein the first side faces the second side;
a gap defined by the first side and the second side; and
a support member that fills a portion of the gap, the support member configured to support the cantilevered portion, wherein the support member is coupled to the base via a first cured adhesive layer, and wherein the support member is coupled to the cantilevered portion via a second cured adhesive layer.

2. The acoustic panel of claim 1, wherein a second portion of the gap is not filled by the support member.

3. The acoustic panel of claim 1, further comprising one or more fasteners extending through the cantilevered portion and the portion of the transcowl to couple the cantilevered portion to the portion of the transcowl.

4. The acoustic panel of claim 1, wherein the plurality of cavities have a hexagonal shape.

5. The acoustic panel of claim 1, further comprising a layer of composite material coupled to at least a portion of the base, wherein a portion of the layer of composite material is coupled to a portion of the cantilevered portion, and wherein the layer of composite material is positioned between the base and the cantilevered portion.

6. The acoustic panel of claim 5, further comprising a second layer of composite material coupled to the cantilevered portion, the support member, and the layer of composite material.

7. The acoustic panel of claim 6, further comprising an additional adhesive coupling the second layer of composite material to each of the cantilevered portion, the support member, and the layer of composite material.

8. The acoustic panel of claim 1, wherein the base and the cantilevered portion form an aerodynamic surface.

9. The acoustic panel of claim 1, wherein the cantilevered portion has a joggled portion to receive the portion of the transcowl.

10. The acoustic panel of claim 1, wherein cantilevered portion is tapered such that a distal end of the cantilevered portion is thicker than a proximal end of the cantilevered portion, and wherein the distal end of the cantilevered portion is further from the base than the proximal end.

11. The acoustic panel of claim 1, further comprising a second layer of composite material, wherein the second layer of composite material is coupled to the cantilevered portion via the support member.

12. The acoustic panel of claim 1, wherein the support member comprises a molded insert, and wherein the cantilevered portion has a substantially constant thickness.

13. The acoustic panel of claim 12, wherein the molded insert comprises a thermoplastic or thermoset polymer material.

14. A vehicle comprising:
an engine;
a cowl partially enclosing the engine; and
a thrust reverser assembly coupled to the cowl, the thrust reverser assembly including a transcowl and including an acoustic panel configured to attenuate noise from the engine, the acoustic panel including:
a base having a surface defining a plurality of cavities, wherein the base includes a first side;
a cantilevered portion extending from the base and configured to be removably coupled with a portion of the transcowl, wherein the cantilevered portion includes a second side, and wherein the first side faces the second side;
a gap defined by the first side and the second side; and
a support member coupled to the cantilevered portion and coupled to the base, the support member configured to support the cantilevered portion, wherein the support member fills a portion of the gap, wherein the support member is coupled to the base via a first cured adhesive layer, and wherein the support member is coupled to the cantilevered portion via a second cured adhesive layer.

15. The vehicle of claim 14, wherein the engine is configured to generate thrust, and wherein the thrust reverser assembly is configured to redirect a portion of the thrust generated by the engine to generate second thrust that partially opposes the thrust.

16. The vehicle of claim 14, wherein the cowl and the acoustic panel include aerodynamic surfaces, and wherein the vehicle is an aircraft, and wherein the engine and thrust reverser assembly are included in a nacelle of the aircraft.

17. A method of manufacturing an acoustic panel for an engine comprising:
applying a layer of composite material to a base, the base having a surface defining a plurality of cavities configured to attenuate noise from the engine, wherein the base includes a first side;
forming a support member on the first side;
applying a layup support material to the layer of composite material; and
forming a cantilevered portion extending from the base, wherein the layup support material is positioned between the first side of the base and a second side of the cantilevered portion, wherein, after forming the cantilevered portion, the layup support material is removed to establish a gap between the first side and the second side, wherein the cantilevered portion is configured to be coupled to and support a transcowl of the engine, and wherein a portion of a surface of the cantilevered portion comprises an aerodynamic surface to direct bypass exhaust of the engine when the transcowl is in a closed position, wherein the support member fills a portion of the gap after the cantilevered portion is formed, wherein the support member is coupled to the base via a first cured adhesive layer, and wherein the support member is coupled to the cantilevered portion via a second cured adhesive layer.

18. The method of claim 17, wherein forming the cantilevered portion comprises:
   applying a pre-cured composite component to the layer of composite material and the layup support material to form the cantilevered portion; and
   curing the layer of composite material to fixedly couple the pre-cured composite component to the base as the first cured adhesive layer.

19. The method of claim 17, wherein forming the cantilevered portion comprises:
   applying a second composite material to the layer of composite material and the layup support material;
   placing a caul plate on the second composite material; and
   curing the layer of composite material and the second composite material to form the cantilevered portion as the second cured adhesive layer.

20. The method of claim 17, further comprising forming one or more openings through the cantilevered portion, the one or more openings configured to accept fasteners that couple the cantilevered portion to the transcowl.

21. The method of claim 20, further comprising fastening one or more nut plates to the cantilevered portion, the one or more nut plates in working relation to the one or more openings.

22. The method of claim 17, wherein the layer of composite material is applied to a first surface of the base, and further comprising applying a second layer of composite material to a second surface of the base, wherein the first surface and the surface of the cantilevered portion correspond to the aerodynamic surface as a first aerodynamic surface and wherein the second surface is opposite the first surface and corresponds to a second aerodynamic surface.

* * * * *